United States Patent
Ranasinghe Mudiyanselage et al.

(10) Patent No.: US 12,556,947 B2
(45) Date of Patent: Feb. 17, 2026

(54) REWARD SIMULATION FOR REINFORCEMENT LEARNING FOR WIRELESS NETWORK

(71) Applicant: Nokia Solutions and Networks Oy, Espoo (FI)

(72) Inventors: Vismika Maduka Ranasinghe Mudiyanselage, Oulu (FI); Kalle Petteri Kela, Espoo (FI); Teemu Mikael Veijalainen, Espoo (FI); Afef Feki, Massy (FR); Dick Carrillo Melgarejo, Espoo (FI); Sakira Hassan, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 19/085,457

(22) Filed: Mar. 20, 2025

(65) Prior Publication Data

US 2025/0310794 A1 Oct. 2, 2025

(30) Foreign Application Priority Data

Mar. 28, 2024 (FI) ...................................... 20245370

(51) Int. Cl.
H04W 24/02 (2009.01)
H04B 17/318 (2015.01)
H04W 24/10 (2009.01)

(52) U.S. Cl.
CPC .......... *H04W 24/02* (2013.01); *H04B 17/328* (2023.05); *H04W 24/10* (2013.01)

(58) Field of Classification Search
CPC ..... H04W 24/02; H04W 24/10; H04B 17/328
See application file for complete search history.

(56) References Cited

U.S. PATENT DOCUMENTS

2017/0243133 A1* 8/2017 Zavesky ................ G06N 20/00
2022/0014963 A1   1/2022 Yeh et al.
(Continued)

FOREIGN PATENT DOCUMENTS

CN   110533192 A   12/2019
CN   113139644 A   7/2021
(Continued)

OTHER PUBLICATIONS

"3rd Generation Partnership Project; Technical Specification Group Radio Access Network; Evolved Universal Terrestrial Radio Access (E-UTRA); Physical layer procedures (Release 18)", 3GPP TS 36.213, V18.0.0, Sep. 2023, 587 pages.
(Continued)

*Primary Examiner* — Charles C Jiang
*Assistant Examiner* — Ryan C Kavleski
(74) *Attorney, Agent, or Firm* — SQUIRE PATTON BOGGS (US) LLP

(57) ABSTRACT

A method includes receiving, by a user device from a network node, a reliability criteria; providing, by the user device, one or more measurements or context information as inputs to a machine learning model; receiving, by the user device from the machine learning model, a predicted action based on the inputs; determining, by the user device, whether the reliability criteria is met for the predicted action; performing, by the user device, the predicted action if the predicted action meets the reliability criteria; and if the predicted action does not meet the reliability criteria: obtaining a simulated reward for the predicted action; and training or updating the machine learning model based on the simulated reward for the predicted action.

11 Claims, 16 Drawing Sheets

(56) References Cited

U.S. PATENT DOCUMENTS

| | | | |
|---|---|---|---|
| 2022/0245513 A1 | 8/2022 | Wang et al. | |
| 2022/0366245 A1* | 11/2022 | Guez | G06N 3/0464 |
| 2023/0071688 A1 | 3/2023 | Lee et al. | |
| 2023/0388817 A1* | 11/2023 | Rydén | H04W 24/02 |
| 2024/0372796 A1* | 11/2024 | Xiong | H04L 43/16 |
| 2025/0113282 A1* | 4/2025 | Rajendran | G06N 3/08 |

FOREIGN PATENT DOCUMENTS

| | | | |
|---|---|---|---|
| CN | 115186097 A | 10/2022 | |
| WO | 2023/198275 A1 | 10/2023 | |
| WO | WO-2024256075 A1 * | 12/2024 | H04W 36/0058 |

OTHER PUBLICATIONS

"3rd Generation Partnership Project; Technical Specification Group Radio Access Network; NR; Physical layer procedures for control (Release 18)", 3GPP TS 38.213, V18.0.0, Sep. 2023, pp. 1-285.

"3rd Generation Partnership Project; Technical Specification Group Radio Access Network; NR; Medium Access Control (MAC) protocol specification (Release 17)", 3GPP TS 38.321, V17.6.0, Sep. 2023, pp. 1-253.

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.

"3rd Generation Partnership Project; Technical Specification Group Radio Access Network; NR; Physical layer procedures for data (Release 18)", 3GPP TS 38.214, V18.0.0, Sep. 2023, p. 1-278.

Canese et al., "Multi-Agent Reinforcement Learning: A Review of Challenges and Applications", Applied Sciences, vol. 11, No. 11, 2021, pp. 1-25.

Office Action received for corresponding Finnish U.S. Appl. No. 20/245,370, dated Oct. 10, 2024, 13 pages.

Deng et al., "A Digital Twin Approach for Self-optimization of Mobile Networks", IEEE Wireless Communications and Networking Conference Workshops (WCNCW), Mar. 29-29, 2021, 6 pages.

Zhao et al., "Cooperative Wind Farm Control With Deep Reinforcement Learning and Knowledge-Assisted Learning", IEEE Transactions on Industrial Informatics, vol. 16, No. 11, Nov. 2020, pp. 6912-6921.

Office Action received for corresponding Finnish U.S. Appl. No. 20/245,370, dated Feb. 27, 2025, 14 pages.

PCT Application No. PCT/EP2024/058611, "Reward Simulation for Reinforcement Learning for Wireless Network", filed on Mar. 28, 2024, pp. 1-53.

Communication of Acceptance for corresponding Finnish U.S. Appl. No. 20/245,370, dated Mar. 13, 2025, 10 pages.

Extended European Search Report received for corresponding European Patent Application No. 25165958.7, dated Jul. 29, 2025, 9 pages.

Lee et al., "Acceleration of applying AI to open intelligent network using parallel simulation for RL training", IEEE Globecom Workshops (GC Wkshps), Dec. 4-8, 2022, pp. 1705-1710.

Vila et al., "On the Training of Reinforcement Learning-based Algorithms in 5G and Beyond Radio Access Networks", IEEE 8th International Conference on Network Softwarization (NetSoft), Jun. 27-Jul. 1, 2022, pp. 207-215.

* cited by examiner

REWARD SIMULATION FOR REINFORCEMENT LEARNING FOR WIRELESS NETWORK

RELATED APPLICATION

This application claims priority to Finnish Application No. 20245370, filed on Mar. 28, 2024, which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. 6G and other networks are also being developed.

SUMMARY

A method may include receiving, by a network node from a machine learning model, a predicted action; determining, by the network node, whether a reliability criteria is met for the predicted action; perform the predicted action if the predicted action meets the reliability criteria; and if the predicted action does not meet the reliability criteria: obtain a simulated reward for the predicted action; and train or update the machine learning model based on the simulated reward for the predicted action.

An apparatus comprising: at least one processor; and at least one memory storing instructions that, when executed by the at least one processor, cause the apparatus at least to: receive, by a network node from a machine learning model, a predicted action; determine, by the network node, whether a reliability criteria is met for the predicted action; perform the predicted action if the predicted action meets the reliability criteria; and if the predicted action does not meet the reliability criteria: obtain a simulated reward for the predicted action; and train or update the machine learning model based on the simulated reward for the predicted action.

A method may include receiving, by a user device from a network node, a configuration to configure the user device to measure and report one or more measurements related to a predicted action; receiving, by the user device from the network node, a request for the user device to perform one or more measurements related to the predicted action; performing, by the user device, the one or more measurements related to the predicted action based on the configuration; and transmitting, by the user device to the network node, the one or more measurements related to the predicted action to enable the network node to train the machine learning model based on the predicted action and a simulated reward that is based on the one or more measurements.

An apparatus comprising: at least one processor; and at least one memory storing instructions that, when executed by the at least one processor, cause the apparatus at least to: receive, by a user device from a network node, a configuration to configure the user device to measure and report one or more measurements related to a predicted action; receive, by the user device from the network node, a request for the user device to perform one or more measurements related to the predicted action; perform, by the user device, the one or more measurements related to the predicted action based on the configuration; and transmit, by the user device to the network node, the one or more measurements related to the predicted action to enable the network node to train the machine learning model based on the predicted action and a simulated reward that is based on the one or more measurements.

A method may include receiving, by a user device from a network node, a reliability criteria; providing, by the user device, one or more measurements or context information as inputs to a machine learning model; receiving, by the user device from the machine learning model, a predicted action based on the inputs; determining, by the user device, whether the reliability criteria is met for the predicted action; performing, by the user device, the predicted action if the predicted action meets the reliability criteria; if the predicted action does not meet the reliability criteria: obtain a simulated reward for the predicted action; and train or update the machine learning model based on the simulated reward for the predicted action.

An apparatus comprising: at least one processor; and at least one memory storing instructions that, when executed by the at least one processor, cause the apparatus at least to: receive, by a user device from a network node, a reliability criteria; provide, by the user device, one or more measurements or context information as inputs to a machine learning model; receive, by the user device from the machine learning model, a predicted action based on the inputs; determine, by the user device, whether the reliability criteria is met for the predicted action; perform, by the user device, the predicted action if the predicted action meets the reliability criteria; and if the predicted action does not meet the reliability criteria: obtain a simulated reward for the predicted action; and train or update the machine learning model based on the simulated reward for the predicted action.

A system comprising: a user device comprising at least one first processor, and at least one first memory storing first instructions, and a network node comprising at least one second processor, and at least one second memory storing second instructions that, when the first and second instructions are executed by the at least one first processor and the at least one second processor, respectively, cause the system to: receive, by the user device from a network node, a first reliability criteria; receive, by the user device from a user device machine learning model, a first predicted action; and obtain, by the user device, a first simulated reward for the first predicted action based on the first predicted action not meeting a reliability criteria; train or update the user device machine learning model based on the first simulated reward for the first predicted action; receive, by the network node from a network node machine learning model, a second predicted action; transmit, by the network node to the user device, a request for the user device to perform one or more measurements related to the second predicted action; receive, by the network node from the user device, one or more measurements related to the second predicted action; and obtain, by the network node, a second simulated reward for the second predicted action based on the second predicted action not meeting a second reliability criteria; and train or update the network node machine learning model based on the second simulated reward for the second predicted action.

A method may include assessing, by a first serving network node, a handover of a user device to a first target network node predicted by a machine learning model using a service quality constraint; in a case where the service quality constraint is not met for the predicted handover to the first target network node: selecting a second target network node for handover of the user device; transmitting a request for a reward simulation to the first target network node for simulating a reward of a handover to the first target network node; transmitting a configuration to the user device for carrying out beam-based measurements with respect to the first target network node for the reward simulation, wherein the configuration comprises an indication to transmit information on the measurements to the second target network node after the handover of the user device to the second target network node; receiving the simulated reward from the first target network node; and using the reward in training the machine learning model.

An apparatus comprising: at least one processor; and at least one memory storing instructions that, when executed by the at least one processor, cause the apparatus at least to: assess, by a first serving network node, a handover of a user device to a first target network node predicted by a machine learning model using a service quality constraint; in a case where the service quality constraint is not met for the predicted handover to the first target network node: select a second target network node for handover of the user device; transmit a request for a reward simulation to the first target network node for simulating a reward of a handover to the first target network node; transmit a configuration to the user device for carrying out beam-based measurements with respect to the first target network node for the reward simulation, wherein the configuration comprises an indication to transmit information on the measurements to the second target network node after the handover of the user device to the second target network node; receive the simulated reward from the first target network node; and use the reward in training the machine learning model.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
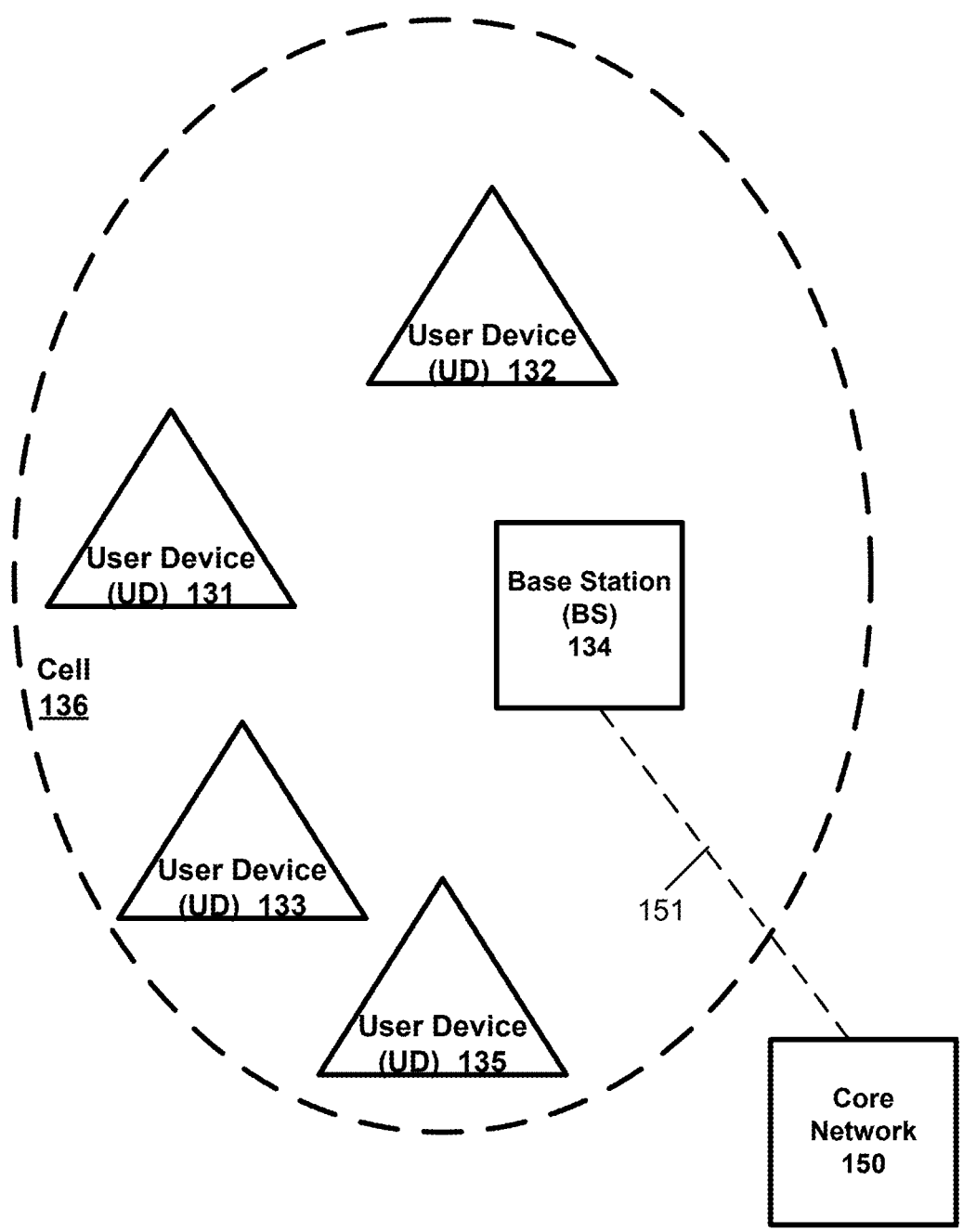
FIG. 1 is a block diagram of a wireless network.

FIG. 1 is a block diagram of a wireless network 130. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a central/centralized unit (CU) and/or a distributed unit (DU) in the case of a split BS or split gNB), or other network node.

Some functionalities of the communication network may be carried out, at least partly, in a central/centralized unit, CU, (e.g., server, host or node) operationally coupled to distributed unit, DU, (e.g., a radio head/node). Thus, 5G networks architecture may be based on a so-called CU-DU split. The gNB-CU (central node) may control a plurality of spatially separated gNB-DUs, acting at least as transmit/receive (Tx/Rx) nodes. In some examples, the gNB-DUs (also referred to as a DU) may comprise e.g., a radio link control (RLC), medium access control (MAC) layer and a physical (PHY) layer, whereas the gNB-CU (also referred to as a CU) may comprise the layers above RLC layer, such as a packet data convergence protocol (PDCP) layer, a radio resource control (RRC) and an internet protocol (IP) layers. Other functional splits are possible too.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

A machine learning (ML) model may be used within a wireless network to perform (or assist with performing) one or more tasks. In general, one or more nodes (e.g., BS, gNB, eNB, RAN node, user node, UE, user device, relay node, or other wireless node) within a wireless network may use or employ a ML model, e.g., such as, for example a neural network model (e.g., which may be referred to as a neural network, an artificial intelligence (AI) neural network, an AI neural network model, an AI model, a machine learning (ML) model or algorithm, a model, or other term) to perform, or assist in performing, one or more ML-enabled tasks. Other types of models may also be used. A ML-enabled task may include tasks that may be performed (or assisted in performing) by a ML model, or a task for which a ML model has been trained to perform or assist in performing).

ML-based algorithms or ML models may be used to perform and/or assist with performing a variety of wireless and/or radio resource management (RRM) and/or RAN-related functions or tasks to improve network performance, such as, e.g., in the UE for beam prediction (e.g., predicting a best beam or best beam pair based on measured reference signals), antenna panel or beam control, RRM (radio resource measurement) measurements and feedback (channel state information (CSI) feedback), link monitoring, Transmit Power Control (TPC), etc. In some cases, ML models may be used to improve performance of a wireless network in one or more aspects or as measured by one or more performance indicators or performance criteria.

Models (e.g., neural networks or ML models) may be or may include, for example, computational models used in machine learning made up of nodes organized in layers. The nodes are also referred to as artificial neurons, or simply neurons, and perform a function on provided input to produce some output value. A neural network or ML model may typically require a training period to learn the parameters, i.e., weights, used to map the input to a desired output. The mapping may occur via the function that is learned from a given data for the problem in question. Thus, the weights are weights for the mapping function of the neural network. Each neural network model or ML model may be trained for a particular task.

To provide the output given the input, the ML functionality of a neural network model or ML model should be trained, which may involve learning the proper value for a large number of parameters (e.g., weights and/or biases) for the mapping function (or of the ML functionality of the ML model). For example, the parameters may be used to weight and/or adjust terms in the mapping function. This training may be an iterative process, with the values of the weights and/or biases being tweaked over many (e.g., tens, hundreds and/or thousands) of rounds of training episodes or training iterations until arriving at the optimal, or most accurate, values (or weights and/or biases). In the context of neural networks (neural network models) or ML models, the parameters may be initialized, often with random values, and a training optimizer iteratively updates the parameters (e.g., weights) of the neural network to minimize error in the mapping function. In other words, during each round, or step, of iterative training the network updates the values of the parameters so that the values of the parameters eventually converge to the optimal values.

ML models may be trained in either a supervised or unsupervised manner, as examples. In supervised learning, training examples are provided to the ML model or other machine learning algorithm. A training example includes the inputs and a desired or previously observed output. Training examples are also referred to as labeled data because the input is labeled with the desired or observed output. In the case of a neural network (which may be a specific case of ML model), the network (or ML model) learns the values for the weights used in the mapping function or ML functionality of the ML model that most often result in the desired output when given the training inputs. In unsupervised training, the ML model learns to identify a structure or pattern in the provided input. In other words, the model identifies implicit relationships in the data. Unsupervised learning is used in many machine learning problems and typically requires a large set of unlabeled data.

According to an example embodiment, a ML model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include finding specific relationships or structure in the input data that allow us to effectively produce correct output data. In some example cases, the input signal may be only partially available, or restricted to special feedback. Semi-supervised learning: the computer may be given only an incomplete training signal; a training set with some (often many) of the target outputs missing. Active learning: the computer can only obtain training labels for a limited set of instances (based on a budget), and also may optimize its choice of objects for which to acquire labels. When used interactively, these can be presented to the user for labeling.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there may be no specific way to compare model performance in most unsupervised learning methods.

Continual Learning (CL) may refer to or may include a capability of the ML model to adapt to ever-changing (or continuously changing, or periodically changing) surrounding environment or data by learning or adapting the ML model continually based on incoming data (or new or updated data), e.g., without forgetting original or previous knowledge or ML model settings, and, e.g., which may be based on less than a full or complete set of data. For example, given a (e.g., potentially unlimited or continuous) stream of data (e.g., data reflecting changing or updated conditions or environment upon which the ML model should be updated), a continual learning (CL) algorithm may (or should) learn, e.g., by updating or adapting weights or other parameters of the ML model, based on a sequence of partial experiences or partial data (e.g., a most recent set of data) where all data may not be available at once, since new or updated data will be received later (thus, the new data potentially renders the weights or parameter settings of the ML model obsolete or inaccurate). Thus, a full or complete set of data may not be considered available at that time of ML model updating or adaptation, since the data or environment may be continuously or continually changing over time. Thus, at any given point or moment in time, data (upon which the ML model may be updated or adapted) may be considered incomplete because there may be a continuous stream of data. Thus, a CL algorithm may include or may refer to iteratively updating or adapting weights or other parameters of the ML model based on an updated set of data, and then repeating the learning or adaptation process for the ML model when a second (or later) set of updated data is received subsequently.

Reinforcement learning (RL) may include may be or may include an interdisciplinary area of machine learning and optimal control concerned with how an intelligent agent should perform actions in a dynamic environment in order to maximize a reward. RL may be a goal based optimization approach where an agent performs an action (e.g., an action performed by a ML model) based on the observed state/context (or inputs) and then receives a reward to learn the optimal policy or train the ML model. To distinguish the good (or preferred) actions from the bad (or non-preferred) actions, the agent may explore the action space (e.g., performing various actions) by performing various actions and observing or obtaining a reward (feedback that may be used to train the ML model). Due to its ability to optimize radio functions, e.g., such as various radio resource management (RRM) functions, based on a reward, RL may be used in future wireless networks. There are many radio functions for which a ML model and/or RL may be used to assist and/or improve performance of the radio function, e.g., such as beam selection (or beam management), power control, assisting in performing handovers, and many others.

A challenge for RL is the impact of exploration on performance and/or resource usage. In some cases, UE and/or gNB performance may be negatively impacted if a bad or poor (or non-preferred) action is selected by the agent or ML model and performed by the UE or network (e.g., gNB) as part of exploration. While the network may observe or obtain a reward (e.g., decreased quality of service (QoS) or decreased throughput based on this action) based on this action that may be used to train the ML model, this training information (reward or feedback used for ML model training) may, at least in some cases, be obtained at the expense of decreased network performance. For example, if a bad or non-preferred action is selected and performed by UE or gNB, the UE may experience lower QoS and/or the gNB may experience a higher resource usage due to transmission errors. In addition, if the selected or predicted action is not performed, then it is unclear how the ML model can be trained during exploration based on this selected or predicted action. Furthermore, due to changes in the environment, retraining of the agent or ML model may be required from time to time. Therefore, to allow exploration and training of ML models via RL, it may be beneficial to allow a ML model to be trained in cases where a predicted (or selected) action is performed, and in cases where a predicted action is not performed. However, obtaining a reward to be used for ML model training in cases where the predicted action is not performed by UE or network remains a challenge.

Figure 2:
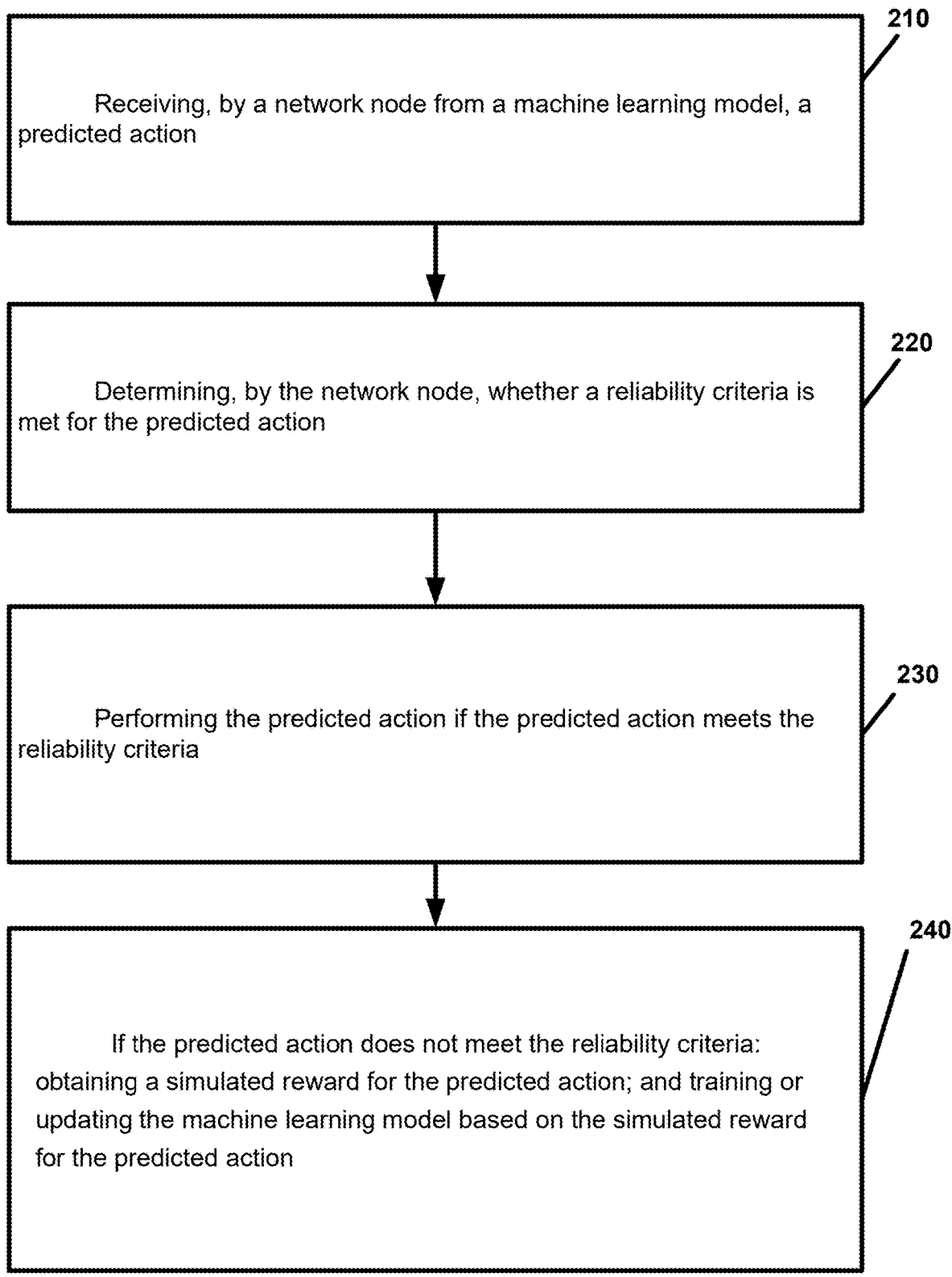
FIG. 2 is a flow chart illustrating operation of a network node.

FIG. 2 is a flow chart illustrating operation of a network node. Operation 210 includes receiving, by a network node (e.g., gNB) from a machine learning model, a predicted action. Operation 220 includes determining, by the network node, whether a reliability criteria is met for the predicted action. Operation 230 includes performing the predicted action if the predicted action meets the reliability criteria. And, operation 240 includes if the predicted action does not meet the reliability criteria: obtaining a simulated reward for the predicted action; and training or updating the machine learning model based on the simulated reward for the predicted action.

With respect to the method of FIG. 2, the obtaining the simulated reward may include calculating, by the network node, the simulated reward based for the predicted action based on one or more measurements related to the predicted action; or obtaining, by the network node, the simulated reward for the predicted action from another node.

With respect to the method of FIG. 2, the obtaining the simulated reward may include: transmitting, by the network node to a user device, a request for the user device to perform one or more measurements related to the predicted action; receiving, by the network node from the user device, one or more measurements related to the predicted action; and obtaining, by the network node, a simulated reward for the predicted action based on the one or more measurements received by the network node.

With respect to the method of FIG. 2, the method may include, if the predicted action does not meet the reliability criteria, omitting performing the predicted action, and performing an alternative action that is selected without the machine learning model (e.g., not based on an output or predicted action from the ML model).

With respect to the method of FIG. 2, the method may include, if the predicted action meets the reliability criteria, performing the following: performing the predicted action; determining an observed reward after performing the predicted action; and training or updating, by the network node, the machine learning model based on the observed reward.

With respect to the method of FIG. 2, the method may include training or updating, by the network node, the machine learning model based on both: 1) an observed reward after performing the predicted action, and 2) the simulated reward for the predicted action when the predicted action is not performed.

With respect to the method of FIG. 2, the performing the predicted action may include performing at least one of the following: directly performing, by the network node, the predicted action; or transmitting, by the network node to the user device, an indication to cause the user device to perform the predicted action.

With respect to the method of FIG. 2, the method may include transmitting, by the network node to the user device, a configuration to configure the user device to measure and report the one or more measurements related to the predicted action.

Figure 3:
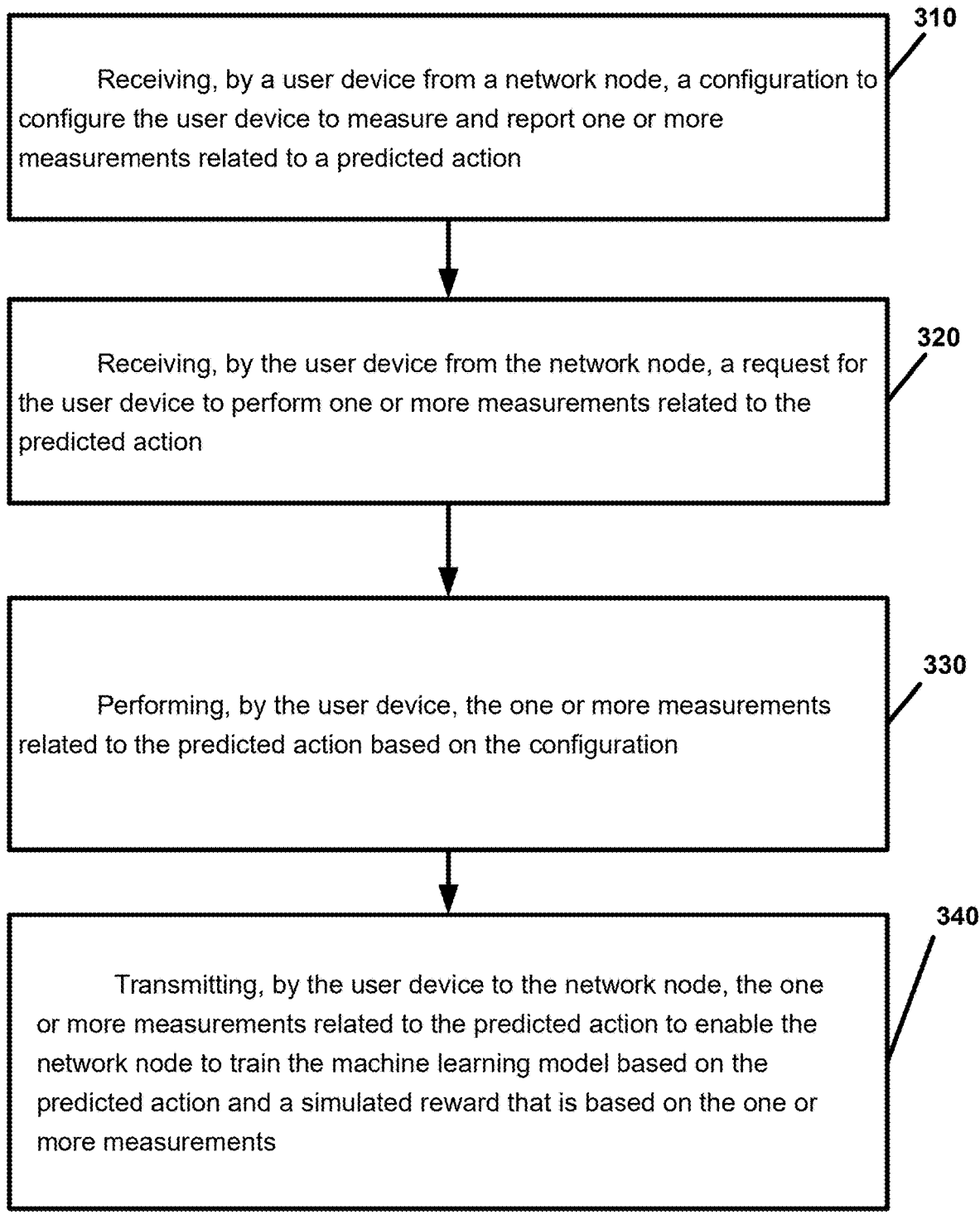
FIG. 3 is a flow chart illustrating operation of a user device.

FIG. 3 is a flow chart illustrating operation of a user device. Operation 310 includes receiving, by a user device from a network node, a configuration to configure the user device to measure and report one or more measurements related to a predicted action. Operation 320 includes receiving, by the user device from the network node, a request for the user device to perform one or more measurements related to the predicted action. Operation 330 includes performing, by the user device, the one or more measurements related to the predicted action based on the configuration. And, operation 340 includes transmitting, by the user device to the network node, the one or more measurements related to the predicted action to enable the network node to train the machine learning model based on the predicted action and a simulated reward that is based on the one or more measurements.

Figure 4:
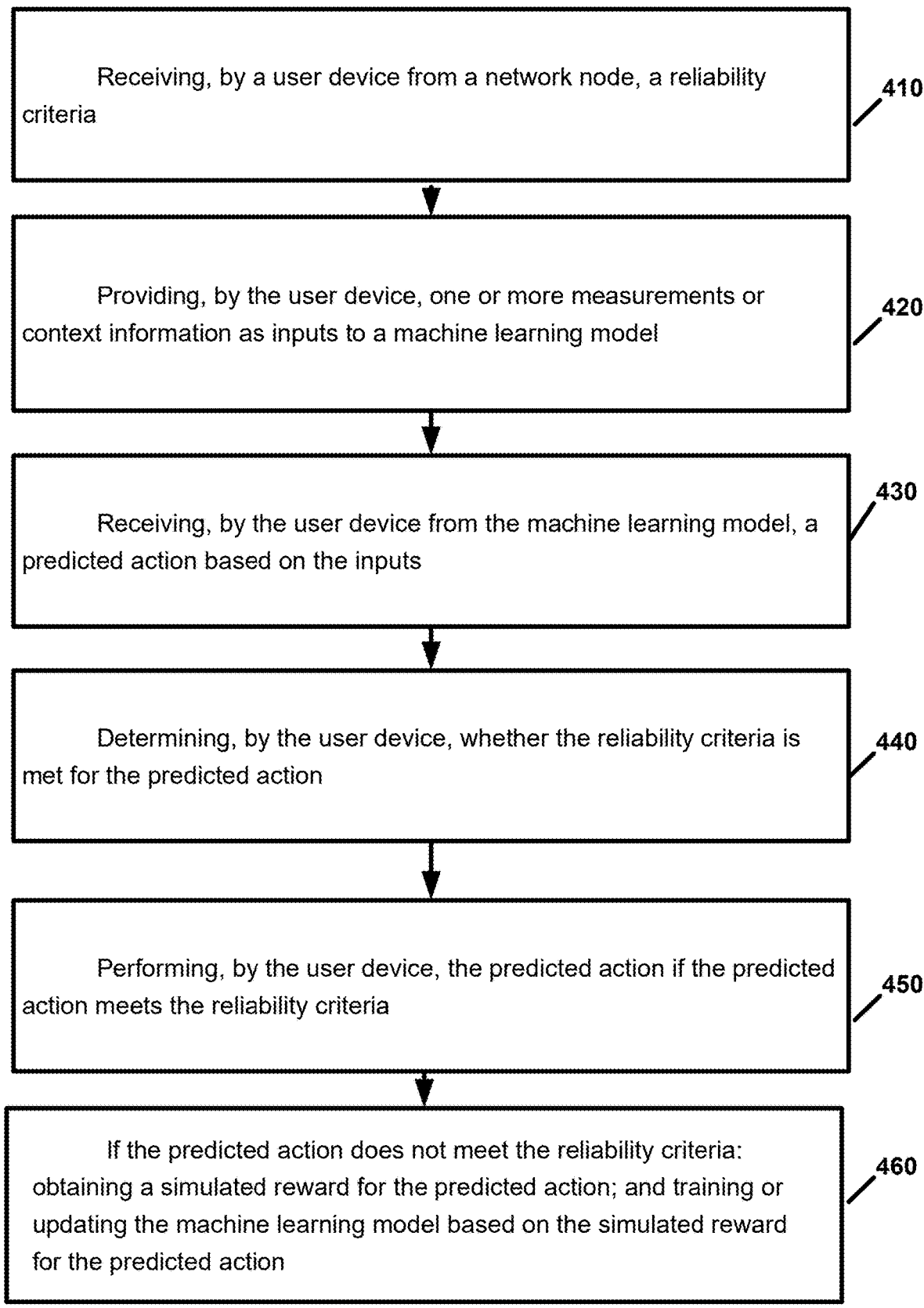
FIG. 4 is a flow chart illustrating operation of a user device.

FIG. 4 is a flow chart illustrating operation of a user device. Operation 410 includes receiving, by a user device from a network node, a reliability criteria. Operation 420 includes providing, by the user device, one or more measurements or context information as inputs to a machine learning model. Operation 430 includes receiving, by the user device from the machine learning model, a predicted action based on the inputs. Operation 440 includes determining, by the user device, whether the reliability criteria is met for the predicted action. Operation 450 includes performing, by the user device, the predicted action if the predicted action meets the reliability criteria. Operation 460 includes, if the predicted action does not meet the reliability criteria: obtaining a simulated reward for the predicted action; and training or updating the machine learning model based on the simulated reward for the predicted action.

With respect to the method of FIG. 4, the obtaining the simulated reward may include: transmitting, by the user device to the network node, a request for the simulated reward for the predicted action; receiving, by the user device from the network node a request to perform measurements related to the predicted action; performing and forwarding (or reporting), by the user device, the requested measurements to the network node; and receiving, by the user device from the network node, the simulated reward for the predicted action.

With respect to the method of FIG. 4, the method may include, if the predicted action does not meet the reliability criteria, omitting performing the predicted action, and performing an alternative action that is selected without the machine learning model.

With respect to the method of FIG. 4, wherein the training or updating the machine learning model may include: training or updating, by the user device, the machine learning model based on the simulated reward for the predicted action; or forwarding, by the user device, the simulated reward for the predicted action to another node to enable the another node to train or update the machine learning model.

With respect to the method of FIG. 4, the method may include, training or updating, by the network node, the machine learning model based on both: 1) an observed reward after performing the predicted action, and 2) the simulated reward for the predicted action when the predicted action is not performed.

With respect to the method of FIG. 4, the method may include, receiving, by the user device from the network node, a configuration to configure the user device to perform measurements related to the predicted action.

Figure 5:
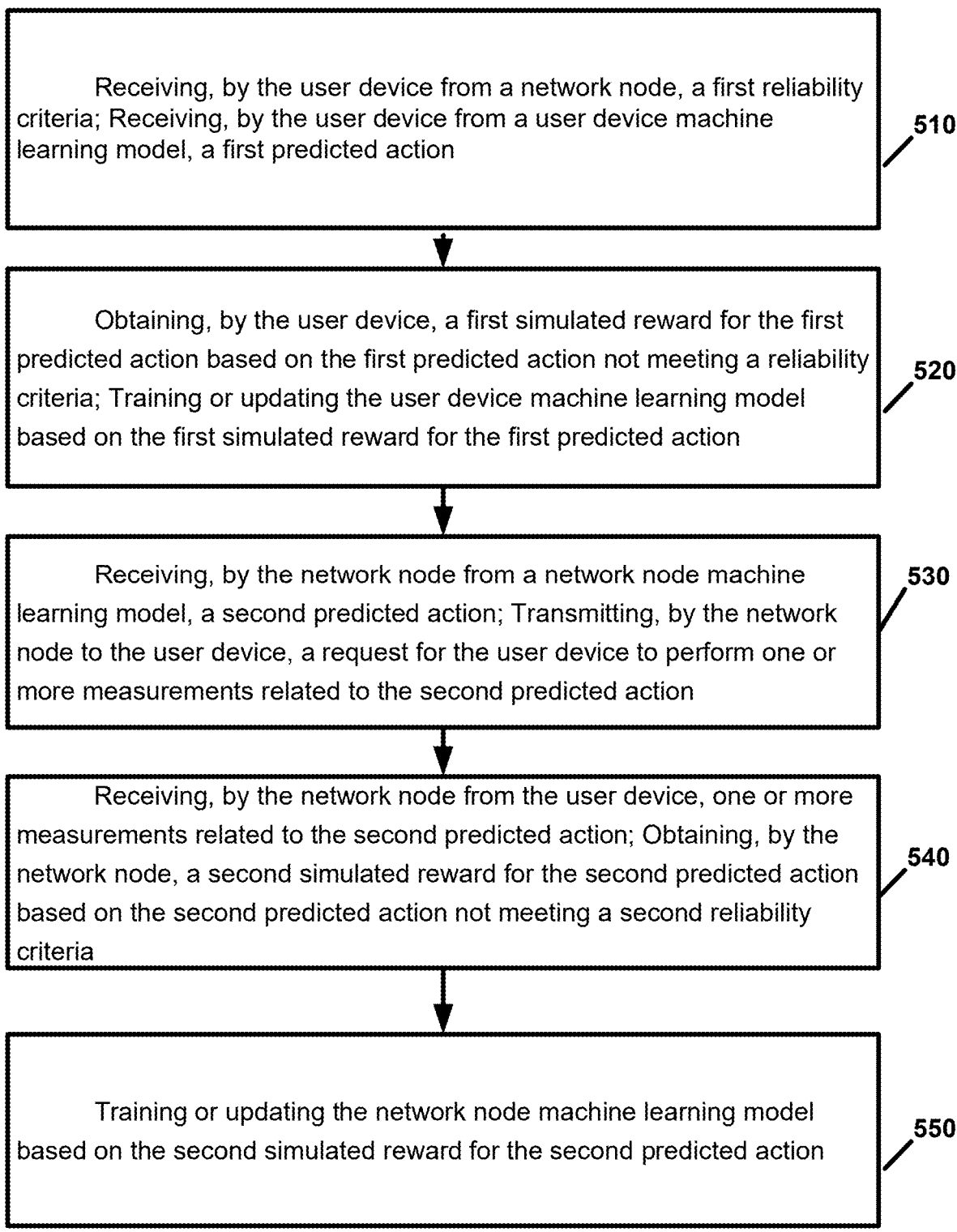
FIG. 5 is a flow chart illustrating operation of a system.

FIG. 5 is a flow chart illustrating operation of a system. Operations 510 includes receiving, by the user device from a network node, a first reliability criteria; and receiving, by the user device from a user device machine learning model, a first predicted action. Operations 520 includes obtaining, by the user device, a first simulated reward for the first predicted action based on the first predicted action not meeting a reliability criteria; and training or updating the user device machine learning model based on the first simulated reward for the first predicted action. Operations 530 include receiving, by the network node from a network node machine learning model, a second predicted action; and transmitting, by the network node to the user device, a request for the user device to perform one or more measurements related to the second predicted action. Operations 540 include receiving, by the network node from the user device, one or more measurements related to the second predicted action; and obtaining, by the network node, a second simulated reward for the second predicted action based on the second predicted action not meeting a second reliability criteria. Operation 550 includes training or updating the network node machine learning model based on the second simulated reward for the second predicted action.

The text and FIGS. 6-15 describe and illustrate examples, features and operations with respect to the flow charts of FIGS. 2-5.

Figure 6:
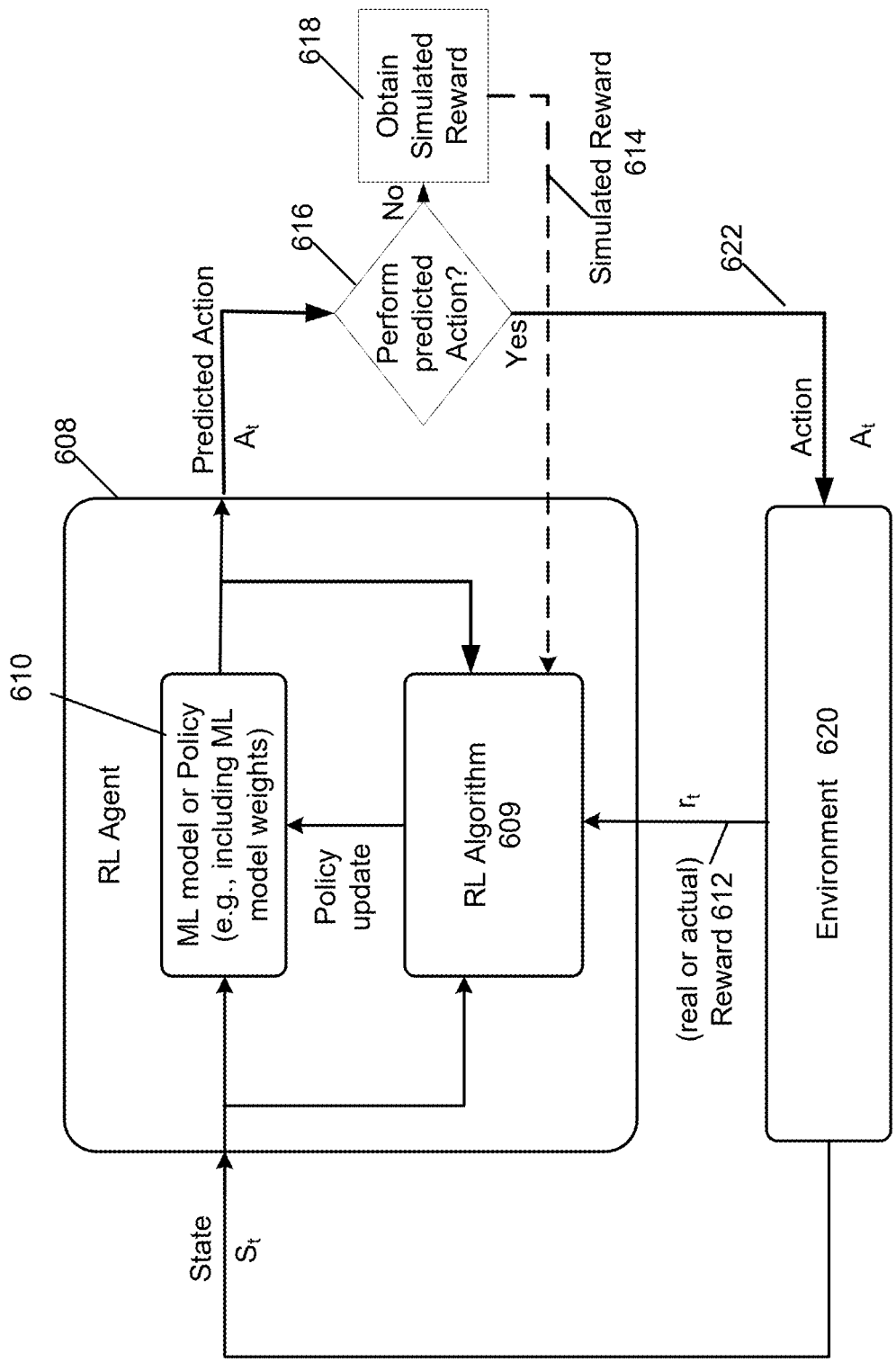
FIG. 6 is a diagram illustrating reinforcement learning at an agent or machine learning (ML) model.

FIG. 6 is a diagram illustrating reinforcement learning at an agent or machine learning (ML) model. The reinforcement learning (RL) agent 608 may be provided at a UE, network node (e.g., gNB) or other node. RL agent 608 may include a RL algorithm 609 and a ML model (or policy) 610. RL agent 608 may observe (e.g., detect) or receive information indicating the state St of the environment 620 (e.g., which may include one or more measurements, and/or other information with respect to the environment). Based on the state $S_t$ of the environment 820, the ML model 610 may predict an action $A_t$. Or, a predicted action may simply be selected randomly (e.g., exploration), or a predicted action may be selected or output using another process. The predicted action may be performed or not performed by the UE and/or network node(s). At 616, it is determined (e.g., by the UE or gNB) whether or not the predicted action will be performed within the network. In the case where the predicted action is performed, the action is performed within the network (e.g., indicated by action $A_t$ input to environment 620 via line 622), and a real reward $r_t$ 612 (which is an actual or real reward that is observed, detected or received, based on performing the predicted action within the network) is observed (e.g., detected) or received (e.g., by the UE or gNB) and then input to RL algorithm 609. RL algorithm 609 may then update the ML model 610 (or policy), e.g., by updating the weights of the ML Model 610 based on the real reward. Furthermore, in the case where an action predicted by ML model 610 is not performed by or within the network (e.g., not performed by UE and/or gNB), at 618, a simulated reward 814 may be obtained and input to RL Algorithm 609 via line 614. The ML model 610 (e.g., weights of the ML model) may then be updated based on the simulated reward.

Therefore, the ML model 610 may be trained based on either or both of: real rewards (based on a predicted action that is actually performed within the network) and simulated rewards (e.g., rewards that are calculated or estimated via simulation or calculation that may estimate the simulated reward as if the predicted action had been performed, even though the predicted action is not actually performed in this case).

Therefore, various techniques and examples are described herein to allow a simulated reward to be obtained and provided to the ML model 610 to allow the ML model to be trained based on the simulated reward, in a case where the predicted action (predicted by the agent or ML model 610) is not performed. The simulated reward may, for example, be a calculated estimate of a reward (e.g., estimated throughput) that would have (e.g., likely) been observed or obtained if the predicted action had been performed within the network (e.g., by UE and/or gNB). As described in greater detail herein, a reliability criteria may be used to determine whether or not the predicted action will be performed.

Figure 7:
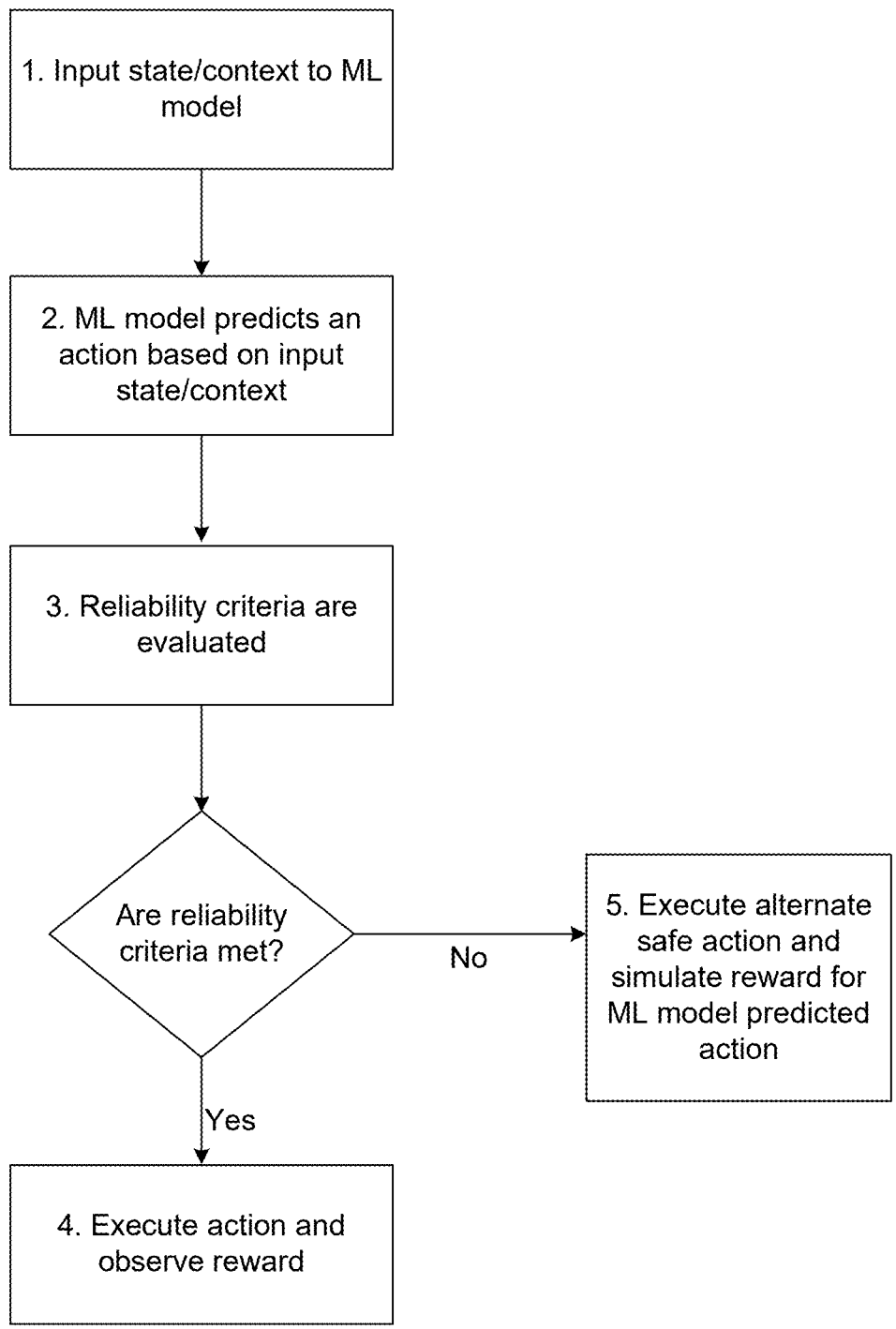
FIG. 7 is a diagram illustrating operation of a user device or network node (e.g., gNB).

FIG. 7 is a diagram illustrating operation of a user device or network node (e.g., gNB). A RL agent 608 or ML model 610 (FIG. 6) may be provided at a UE or gNB. At Step 1, RL agent 608 or ML model 610 (FIG. 6) observes the context or state (e.g., context or state related to the network may be received as input(s) to the ML model 610). At step 2, the ML model predicts an action based on the input context or state information. The predicted action may be, for example, an action to learn the environment (e.g., exploration) or to optimize the reward (e.g., train ML model weights to improve accuracy and performance of the ML model).

At Step 3 of FIG. 7, at a UE or network node (e.g., gNB), the predicted action may be compared to a reliability criteria (or service quality constraint) to determine whether the predicted action meets the reliability criteria. For example, the reliability criteria may be used to determine if the predicted action is within a subset of actions that can be performed that will likely provide or maintain an acceptable or threshold level of performance of the network. For example, reliability criteria may be defined based on the UE's QoS (Quality of Service) class and/or the impact of the predicted action (if performed) on network performance (or performance of service delivered to the UE), resource usage, or other performance-related parameter or measurement.

At Step 4 of FIG. 7, if the predicted action meets the reliability criteria, then the predicted action is performed (e.g., by the UE or gNB), e.g., because the predicted action is not expected to significantly negatively impact network performance. At Step 5 of FIG. 7, if the predicted action does not meet the reliability criteria, this may indicate that the predicted action, if performed, may significantly negatively impact network performance or degrade performance of services provided to the UE. Therefore, at Step 5, if the predicted action does not meet the reliability criteria, the predicted action is not performed (performing the predicted action is omitted), and instead an alternative action is performed by the UE and/or gNB. The alternative action may be, e.g., a safe action, an action that is unrelated or not predicted by the ML model 610 (FIG. 6), an action that meets the reliability criteria (also referred to as service quality constraint), and/or an action that may be selected according to expert knowledge or an established set of rules. The alternative action is different from the predicted action.

As noted, in reinforcement learning (RL), such as during exploration or otherwise, the ML model 610 may predict an action that, if performed, may result in significant performance degradation of the network, and, e.g., may even result in radio link failure (RLF) in some cases. As described herein, a reliability criteria may be used to determine whether a predicted action is of sufficient accuracy, or will provide an expected or minimal network performance, to be performed or not. If the predicted action meets the reliability criteria, then the predicted action may be performed and the reward (e.g., throughput or other key performance indicator (KPI)) may be observed and used to train the ML model 610. On the other hand, if the predicted action does not meet the reliability criteria, then a simulated reward is obtained (e.g., that is calculated or estimated as if the predicted action had been performed) and used to train the ML model 610.

Figure 8:
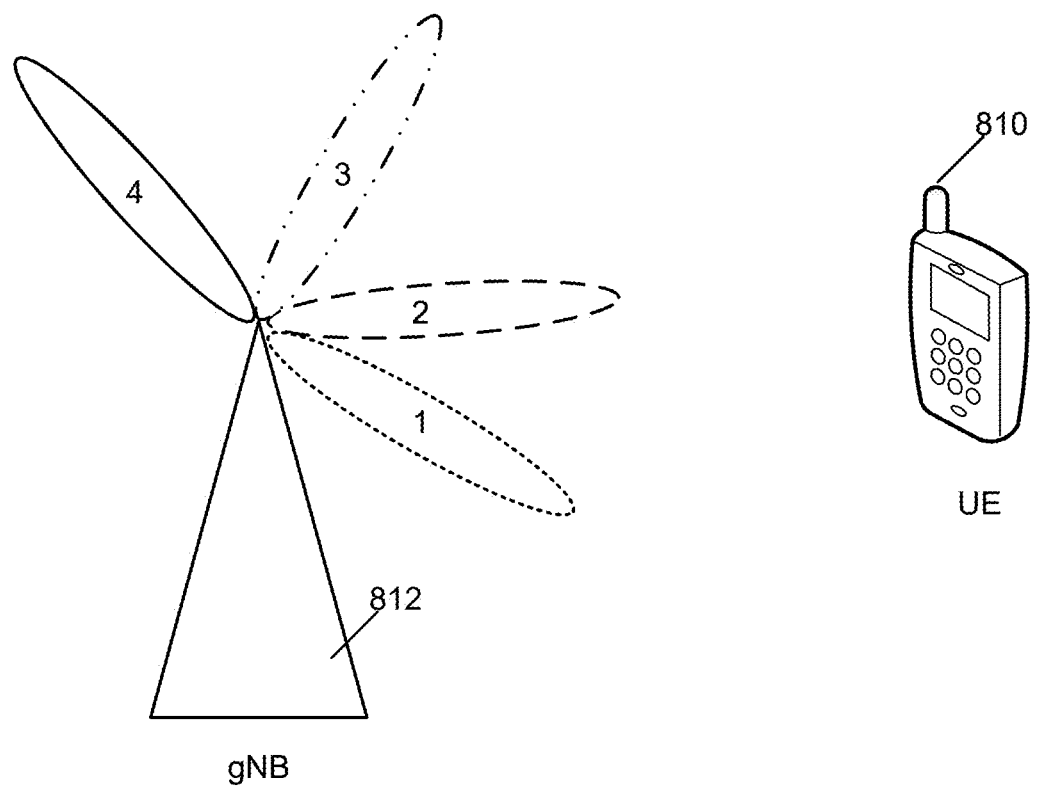
FIG. 8 is a diagram illustrating beams that may be predicted for use in communications between a UE 810 and a gNB 812.

Beam selection is an example radio function for which ML models and/or reinforcement learning (RL) may be applied or used. FIG. 8 is a diagram illustrating beams that may be predicted for use in communications between a UE 810 and a gNB 812. In this example, any of gNB beams 1, 2, 3 or 4 may be used by gNB 812 for communicating with UE 810, or may include UE beams for communicating with gNB 812. In the illustrative example of FIG. 8, during communication between UE 810 and gNB 812, the UE 810 may be served by beams 1, 2 or 3, since these three beams point (at least to some degree) towards UE 810. However, beam 4 cannot (or should not) be used to serve UE 810 because beam 4 points in a direction that is away from UE 910. gNB 812 may transmit channel state information-reference signals (CSI-RS) for different beams, such as for beams 1, 2, 3 and 4 (among others), and the reference signal received power (RSRP) for each beam may be measured by UE 810 and reported to gNB 812. For example, the measured RSRP (reference signal received power) of beams 1-3 (or at least some of beams 1-3) may be a sufficient level, whereas it may be expected that the measured (e.g., measured by UE 810) RSRP of beam 4 is not of a sufficient level. Thus, ML model 610 that predicts beam 4 for communication with UE 810, and where beam 4 is actually used for communication between UE 810 and gNB 812, may result in a radio link failure for UE 810.

The operations FIG. 7 may be applied to the beam selection example described with respect to FIG. 8. In this illustrative example for beam selection, a reliability criteria (which may also be referred to as a service quality constraint) may be used that is, for example, either (either or both of these may be used a reliability criteria): 1) the predicted beam must have a minimum RSRP (predicted beam RSRP>threshold RSRP); or 2) the predicted beam must be within (or one of) the top N (e.g., top 2) best beams that have highest measured RSRP. These are two examples of a reliability criteria (or service quality constraint) that may be used for a radio function of beam selection.

At Step 2 of FIG. 7 (as applied to the beam selection example of FIG. 8) for this beam selection example, the ML model 610 predicts an action, where the predicted action may be a predicted beam of the beams 1-4 to be used for communicating between gNB 812 and UE 810. At Step 3 of FIG. 7 for this beam selection example, the reliability criteria (or service quality constraint) is assessed or evaluated (with respect to the predicted beam), and it is determined whether or not the reliability criteria is met for the predicted beam. In an example, the determining whether the reliability criteria is met for the predicted action (a predicted beam for communication in this example) may (at least in some cases) include determining whether a value of a parameter (e.g., value of the RSRP) associated with the predicted action (e.g., value of the RSRP of the predicted beam) meets the reliability criteria (e.g., meets the threshold RSRP that is used as the reliability criteria). Or, for example, in this beam selection example, it is determined whether the RSRP is greater than the threshold RSRP, or whether the selected beam is within (or one of) the top two beams (top two beams based on measured RSRP) for the UE 810.

At Step 4 of FIG. 7 for beam selection example, it is determined whether the predicted action meets the reliability criteria, and for this beam selection example, it is determined whether the predicted beam meets the reliability criteria. At Step 4 of FIG. 7 for this beam selection example, if the predicted beam (predicted to be used for communications with UE 810) is beam 2, then the RSRP of beam 2 is compared to the threshold RSRP (to determine whether the RSRP of predicted beam 2 is greater than the threshold RSRP), or it is determined whether beam 2 is one of the top two beams for communicating with UE 810, to determine whether beam 2 meets the reliability criteria. In this case, beam 2 may be used for communication with UE 810 if beam 2 meets the reliability criteria (e.g., beam 2 has a measured RSRP (measured by UE 810) that is greater than the threshold RSRP that beam 2 is one of the top 2 beams (whichever of these or both of these that are used for reliability criteria for this beam selection example). After performing the predicted action (e.g., after gNB 812 uses beam 2 for communication with UE 810), the environment may be detected (e.g., based on one or more measurements) and the (real) reward is observed (e.g., measured or detected). The reward in this case may be a real throughput for communication from the gNB 812 to the UE 810 and/or from the UE 810 to the gNB 812, based on or using this predicted beam 2 during communications. This real reward may then be provided or input to ML model 610 (FIG. 6) to train or update the ML model 610.

Also, with respect to Step 5 of FIG. 7 for this beam selection example, if the predicted beam is beam 4, it is determined (at Step 3) whether or not beam 4 meets the reliability criteria, e.g., whether the measured RSRP of beam 4 is greater than the threshold RSRP or whether beam 4 is one of the top 2 beams for UE 810 (depending on which or both of these that may be used as reliability criteria). If the predicted beam (e.g., beam 4) does not meet the reliability criteria, then the predicted action is not performed (e.g., the predicted beam 4 is not used for communication with UE 810), and an alternative action is or may be performed. In other words, the predicted action may be a predicted beam, or may be a communication with UE 810 using the predicted beam. If RSRP of beam 4 is less than the threshold RSRP (e.g., beam 4 does not meet the example reliability criteria), then the predicted action is not performed, e.g., beam 4 is not used for communication (or communication with UE 810 via beam 4 is omitted), and an alternative action may be performed. The alternative action that may be performed may include, for example, using an alternative beam for communication by gNB 812 with UE 810, such as a beam that is unrelated to or not predicted by the ML model 610 and/or a beam such as beam 2 that meets the reliability criteria. Thus, as the alternative action in this case, beam 2 (e.g., which meets the reliability criteria) may be used for communicating with UE 810.

And, at Step 5 of FIG. 7 for this beam selection example, a simulated reward may be obtained for the predicted action, e.g., a simulated reward may be calculated or may be obtained as if (or based on the assumption) that beam 4 is used by gNB 812 for communication with UE 810. In this beam selection example, the simulated reward may be an estimate of throughput that would (or would likely) occur with respect to communication between the gNB 812 and UE 810 based on using the predicted gNB beam 4. Also, for example, a simulated reward, as simulated throughput, may be calculated or estimated based on, e.g., measured signal to interference-plus-noise ratio (SINR) and/or channel quality indication (CQI) measurements, which in some cases may be measured by the UE and reported to the gNB 912, with respect to the predicted action (e.g., for beam 4). Thus, in this example, to obtain or estimate a simulated reward for the predicted action (e.g., to estimate throughput based on using the predicted beam 4), the UE 810 may perform CQI and/or SINR measurements with respect to beam 4 (e.g., UE 810 measurements of CQI and/or SINR of received reference signals when gNB 812 transmits reference signals via the predicted beam 4. These CQI/SINR measurements with respect to the predicted action (e.g., with respect to the predicted beam) may be provided or transmitted to a node that may simulate the reward for the predicted beam 4. Thus, the gNB 812 or other node, that can calculate simulated rewards, may calculate or estimate the simulated reward (e.g., estimated throughput) for predicted beam 4. This simulated reward may then be provided to the node (e.g., gNB 812 or UE 810) where the ML model 610 is located. Thus, the simulated reward may thus be obtained by gNB 812 (FIG. 8), UE 810, or other node that has the ML model 610. The simulated reward may then be used to update the ML model 610.

Figure 9:
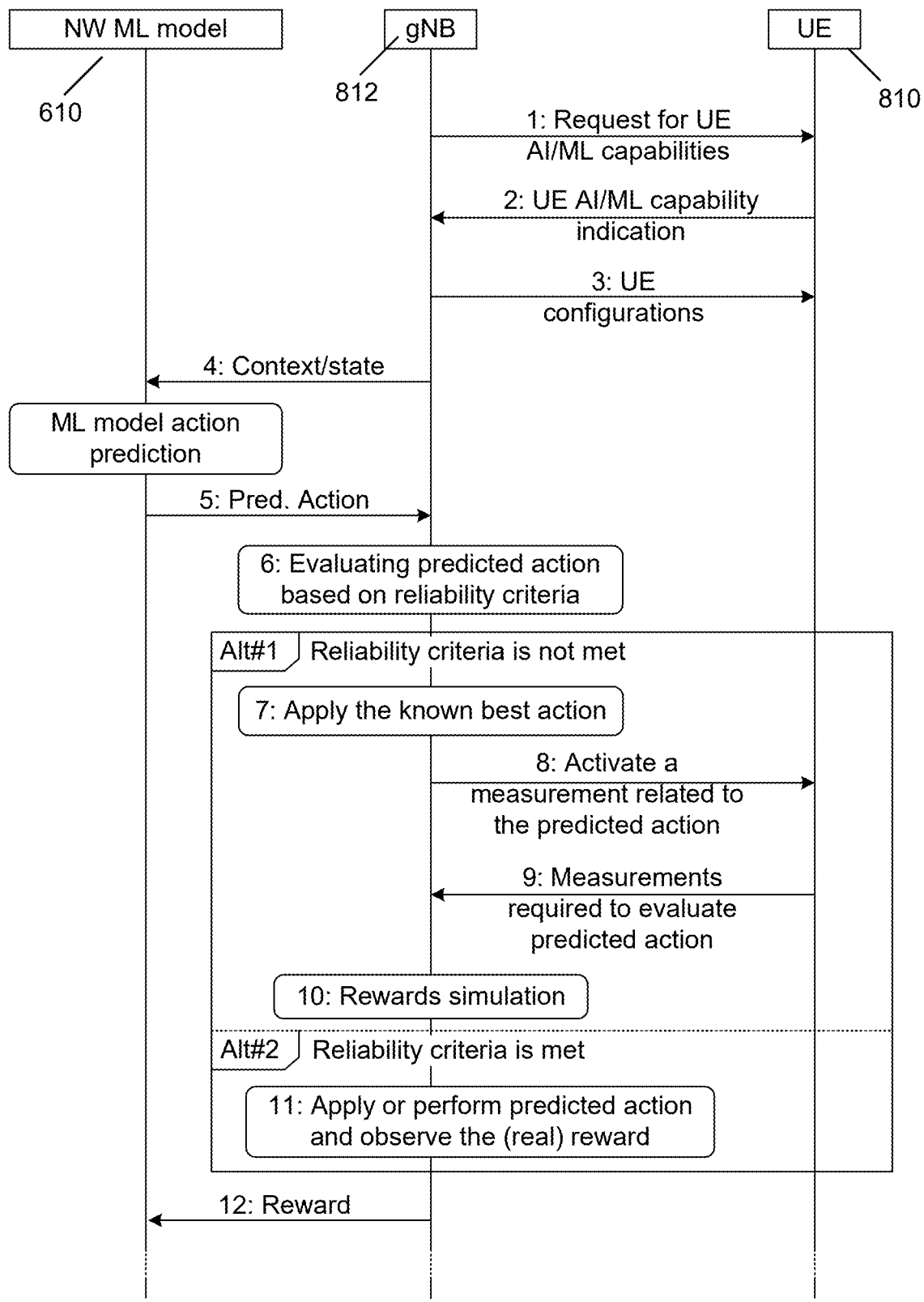
FIG. 9 is a diagram illustrating operation in a case where there is a network sided ML model 610 and reward simulation is performed at the network side.
Figure 10:
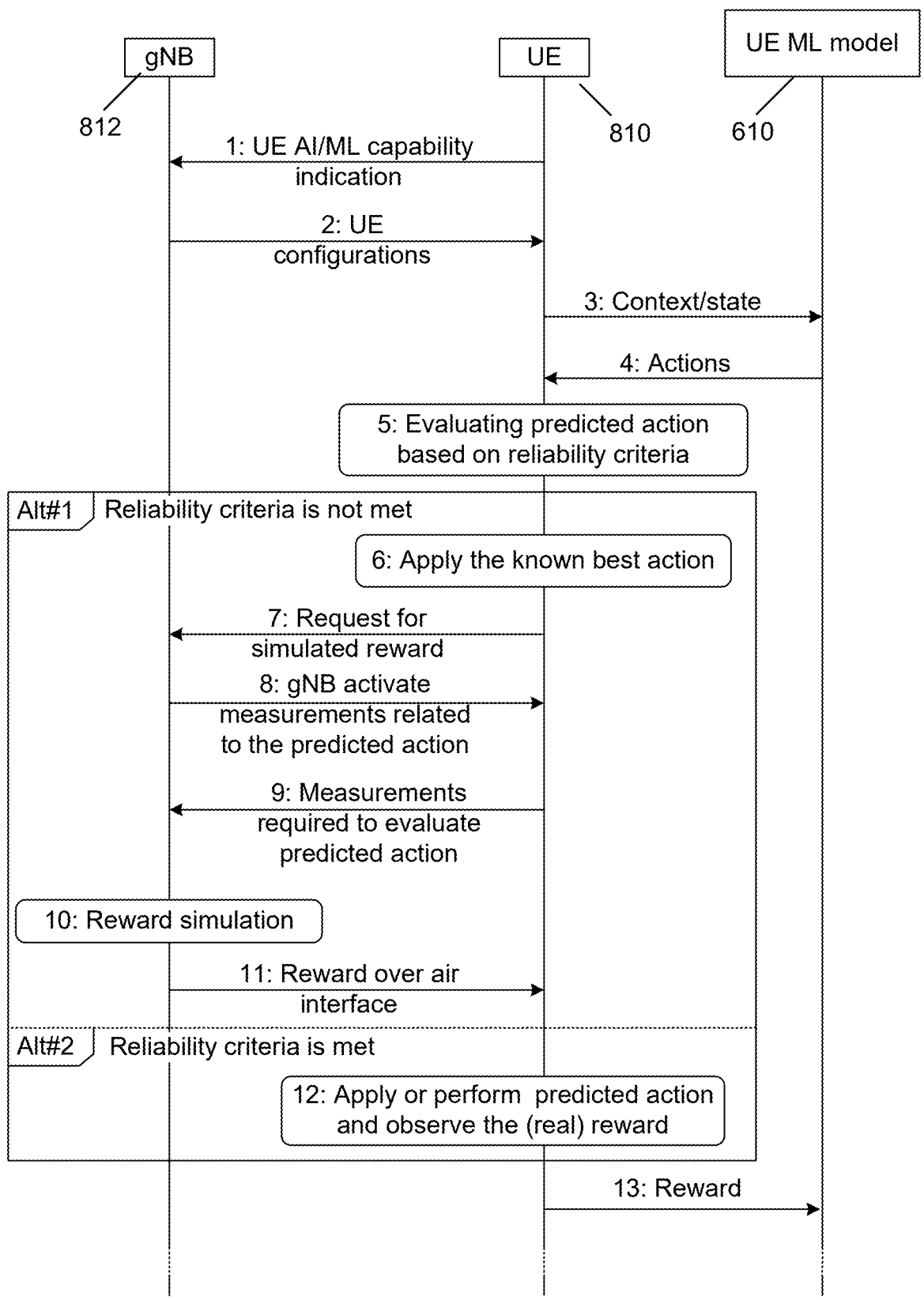
FIG. 10 is a diagram illustrating operation in a case where there is a UE sided ML model 610 and reward simulation is performed at the network side.

As noted, the ML model (or RL model) may be provided or deployed in a UE 810 or a gNB 812. Simulation (e.g., calculation of the simulated reward) may be performed at a network node (e.g., gNB), or other node that is capable of calculating simulated rewards (e.g., a simulation entity). FIGS. 9-10 cover example cases in which only measurements from the serving gNB are required to perform simulation (e.g., measurements from other gNB or neighbor gNBs are not required to calculate or determine simulated rewards). FIGS. 12-15 may include use of measurements that are obtained from or with respect to other (non-serving) gNBs or neighbor gNBs that are used for reward simulation.

FIG. 9 is a diagram illustrating operation in a case where a network sided ML model 610 (ML model 610 provided or deployed at a serving gNB 812) and reward simulation is performed at the network side (either at serving gNB 812 or other node).

Step 1 of FIG. 9: serving gNB 812 transmits a request to UE 810, to request UE AI/ML capabilities to enable or support network sided ML model for RL, UE capabilities to support reinforcement learning (RL), UE capabilities related simulated rewards for ML models and/or UE capabilities to perform measurements for simulated reward calculations as part of RL.

Step 2 of FIG. 9: UE 810 communicates to the gNB 812, the UE AI/ML capabilities to enable or support network sided ML model for RL, UE capabilities to support reinforcement learning (RL), UE capabilities related simulated rewards for ML models and/or UE capabilities to perform measurements for simulated reward calculations as part of RL. UE 810 may indicate the exploration constraints in case the action is executed by gNB. The gNB may take this information into consideration when applying the action, e.g., in the case of beam management (beam selection), UE may indicate that the selected beam should be the top N (e.g., top 2) of measured beams, or may indicate that the RSRP value of selected beam needs to be beyond a certain threshold based on its capabilities (thus, UE 810 may indicate the RSRP to be used as reliability criteria (or service quality constraint), in this example).

Step 3 of FIG. 9: UE 810 is configured by gNB 812 to measure and report the required measurement quantities (e.g., configured to report CQI and SINR) to simulate the reward. In this case, gNB 812 may need to configure the UE 810 to perform measurements related to the predicted action (e.g., measure and report CQI and/or SINR for the predicted beam) and report them back to gNB 812 for reward simulations.

Step 4 of FIG. 9: Context/State vector is created as an input for the RL agent 08 or ML model 610. For example, in the example use case of beam selection, RSRP values of best N beams are used to create the input context/state vector to the ML model.

Step 5 of FIG. 9: Based on the context or state input, the ML model 610 predicts the action (the predicted action). In the beam selection example, the predicted action may include a predicted beam to be used for communication. When the predicted action is available, a set of reliability criteria are evaluated. The reliability criteria may depend on the exploration constraints communicated by the UE in Step 2. These reliability criteria may be set to minimize the QoS disruptions and may be decided by the gNB 812 based on information from UE 810, for example.

Step 6 of FIG. 9: gNB 812 evaluates the predicted action (e.g., predicted beam) based on reliability criteria (or service quality constraint). For example, gNB 812 checks whether the predicted beam RSRP value is greater that the RSRP threshold, or whether predicted beam is one of the top 2 measured beams, based on reliability criteria provided by UE 810 to gNB 812 in Step 2 (alternatively, gNB 812 may know or may determine the reliability criteria).

Alternative #1 is where the predicted beam (e.g., RSRP of predicted beam is not greater than threshold, or predicated beam is not one of the top 2 measured beams) does not meet the reliability criteria, and includes Steps 7-10. Alternative #2 is where the predicted beam meets the reliability criteria.

Step 7 of FIG. 9: gNB 812 does not perform the predicted action (e.g., predicted beam is not used for communication with UE 810), and gNB 812 applies or performs an alternative action, which may be the best action based on domain specific knowledge. For example, if the RL agent or ML model predicts a beam which does not meet the reliability criteria or service quality constraint, then the strongest beam in terms of RSRP is the best action based on domain specific knowledge. Thus, in this case, the gNB 812 may use the best or strongest beam for communication with UE 810, and omit using the predicted beam for communication (or not perform the predicted action).

Steps 8 & 9 of FIG. 9: At Step 8, gNB 812 transmits a request to UE 810 requesting the UE measurements related to the predicted action, and gNB transmits the configured reference symbols or reference signals (e.g., CSI-RS signals via the predicted beam) to allow the UE 810 to perform the configured CQI and/or SINR measurements with respect to this predicted beam. At Step 9, the UE 810 performs and reports back to gNB 812 the CQI and SINR measurements for the predicted beam. The required resources (e.g., time frequency resources) for transmission of reference symbols or reference signals are configured already in Step 3.

Step 10 of FIG. 9: serving gNB 812 simulates the reward (calculates or estimates the simulated reward based on the received measurements related to predicted action (e.g., based on the received CQI and/or SINR measurements related to predicted beam). For example, in the beam management or beam selection example, if the simulated reward is based on throughput, gNB 812 may use the measurement of the predicted beam along with scheduler assumptions and other system information like target block error rate (BLER) for the UE 810 to calculate the throughput. A L2S (link to system) mapping technique may be used to obtain the modulation order and coding scheme (MCS) for the target BLER to calculate the throughput.

Step 11 of FIG. 9: If the set of reliability criteria or service quality constraint is met by the predicted action: the gNB 812 executes or performs the predicted action and observes the (real) reward. For example, if the predicted beam is within the best N beams, that beam can be selected and used for communication, and the achieved throughput within the fixed time interval can be observed (e.g., measured or detected).

Step 12 of FIG. 9: The simulated reward or real reward is fed back or provided to the RL agent or ML model 610 to be used to adjust or train the ML model (e.g., adjust weights of the ML model).

FIG. 10 is a diagram illustrating operation in a case where a UE (or user device) sided ML model 610 (ML model 610 provided or deployed at a user device or UE) and reward simulation is performed at the network side (either at serving gNB 1010 or other node).

Step 1 of FIG. 10: UE 810 indicates the RL or ML functionality and the requirement of performing online training via UE AI/ML capabilities. UE 810 may indicate its AI/ML capabilities to enable or support network sided ML model for RL, UE capabilities to support reinforcement learning (RL), UE capabilities related simulated rewards for ML models and/or UE capabilities to perform measurements for simulated reward calculations as part of RL. UE 810 may indicate to gNB 812 the quantities or parameters (e.g., CQI and SINR) that are needed to calculate a simulated reward for the predicted beam.

Step 2 of FIG. 10: gNB 812 configures the UE 810. For example, gNB 812 may configured the UE 810 with the reliability criteria (or service quality constraint), e.g., the requirement that the predicted beam must be among the best N (e.g., best 2 or best 4) beams measured by the UE. This is just an example reliability criteria or service quality constraint, and others may be used. A configuration provided by gNB 812 to UE 810 may include, for example, the actions UE 810 can apply, the actions UE 810 may ask for a simulated reward, and the measurements (e.g., CQI and SINR) the UE 810 needs to measure and report to gNB 812 to simulate the reward. In this case gNB 812 may need to allocate additional resources to perform measurements related to the predicted action (e.g., resources to be used to transmit reference signals via predicted beam, to allow the UE 810 to perform the CQI and/or SINR measurements for the predicted beam).

Step 3 of FIG. 10: Context/State vector (or a set of ML model inputs) is created as an input for the RL agent or ML model 610 (FIG. 6).

Step 4 of FIG. 10: ML model 610 predicts the action, e.g., ML model predicts the predicted beam. This can be an action to explore the action space or best action based on the previous knowledge. When the predicted action (e.g., predicted beam) is available, a set of reliability criteria are evaluated. These criteria are based on the configuration the UE 810 has received in Step 2.

Step 5 of FIG. 10: Evaluating the action based on reliability constraints (service quality constraint). UE 810 evaluates the predicted action (e.g., predicted beam) based on reliability criteria or service quality constraint. For example, UE 810 checks whether the predicted beam is among the best 2 or best 4 beams measured and reported by the UE (e.g., based on UE capability), based on reliability criteria (service quality constraint) provided to UE 810 in Step 2 (alternatively, gNB 812 may know or may determine the reliability criteria).

Alternative #1 is where the predicted beam (e.g., RSRP of predicted beam) does not meet the reliability criteria, and includes Steps 6-11. Alternative #2, including Step 12, is where the predicted beam meets the reliability criteria (e.g., the predicted beam is among top N (e.g., top 2 or top 4) best (such as those beams having highest or strongest RSRP) beams measured and reported by UE, or the RSRP of the predicted beam is greater than a threshold).

Step 6 of FIG. 9: UE 810 does not perform the predicted action (e.g., predicted beam is not used for communication with gNB 812), and UE applies or performs an alternative action, which may be the best action based on domain specific knowledge. For example, if the RL agent or ML model predicts a beam which does not meet the reliability criteria, then the strongest beam in terms of RSRP is the best action based on domain specific knowledge. Thus, in this case, the UE may use the best or strongest beam for communication with gNB 812.

Step 7 of FIG. 10. UE 810 transmits a request to gNB 812 for a simulated reward for the predicted action (and may indicate the predicted action). In this example, the UE 810 may indicate the predicted beam.

Steps 8 & 9 of FIG. 10: At Step 8, gNB 812 transmits a request to UE 810 requesting the UE measurements related to the predicted action, and gNB 812 transmits the configured reference symbols or reference signals (e.g., CSI-RS signals via the predicted beam) to allow the UE 810 to perform the configured CQI and/or SINR measurements with respect to this predicted beam. At Step 9, the UE 810 performs and reports back to gNB 812 the CQI and SINR measurements for the predicted beam. The required resources (e.g., time frequency resources) for transmission of reference symbols or reference signals are configured already in Step 3.

Step 10 of FIG. 10: serving gNB 812 simulates the reward (calculates or estimates the simulated reward based on the received measurements related to predicted action (e.g., based on the received CQI and/or SINR measurements for or related to predicted beam). For example, in the beam management or beam selection example, if the simulated reward is based on throughput, gNB 812 may use the CQI and SINR measurements for the predicted beam along with scheduler assumptions and other system information like target block error rate (BLER) for the UE 810 to calculate (or estimate) the throughput (this estimated throughput for the predicted beam is the simulated reward). A L2S (link to system) mapping technique may be used to obtain the modulation order and coding scheme (MCS) for the target BLER to calculate the throughput.

Step 11 of FIG. 10: The gNB 812 transmits to UE 810 the simulated reward (e.g., the estimated throughput for the predicted beam).

Step 12 of FIG. 10: If the set of reliability criteria are met by the predicted action: the gNB 812 executes or performs the predicted action and observes the (real) reward. For example, if the predicted beam is within the best N beams, that beam can be selected and achieved throughput within the fixed time interval can be observed (e.g., measured or detected).

Step 13 of FIG. 10: UE 810 provides the reward (real reward or simulated reward) to the ML model 610, to be used to adjust or train the ML model (e.g., adjust weights of the ML model).

Figure 11:
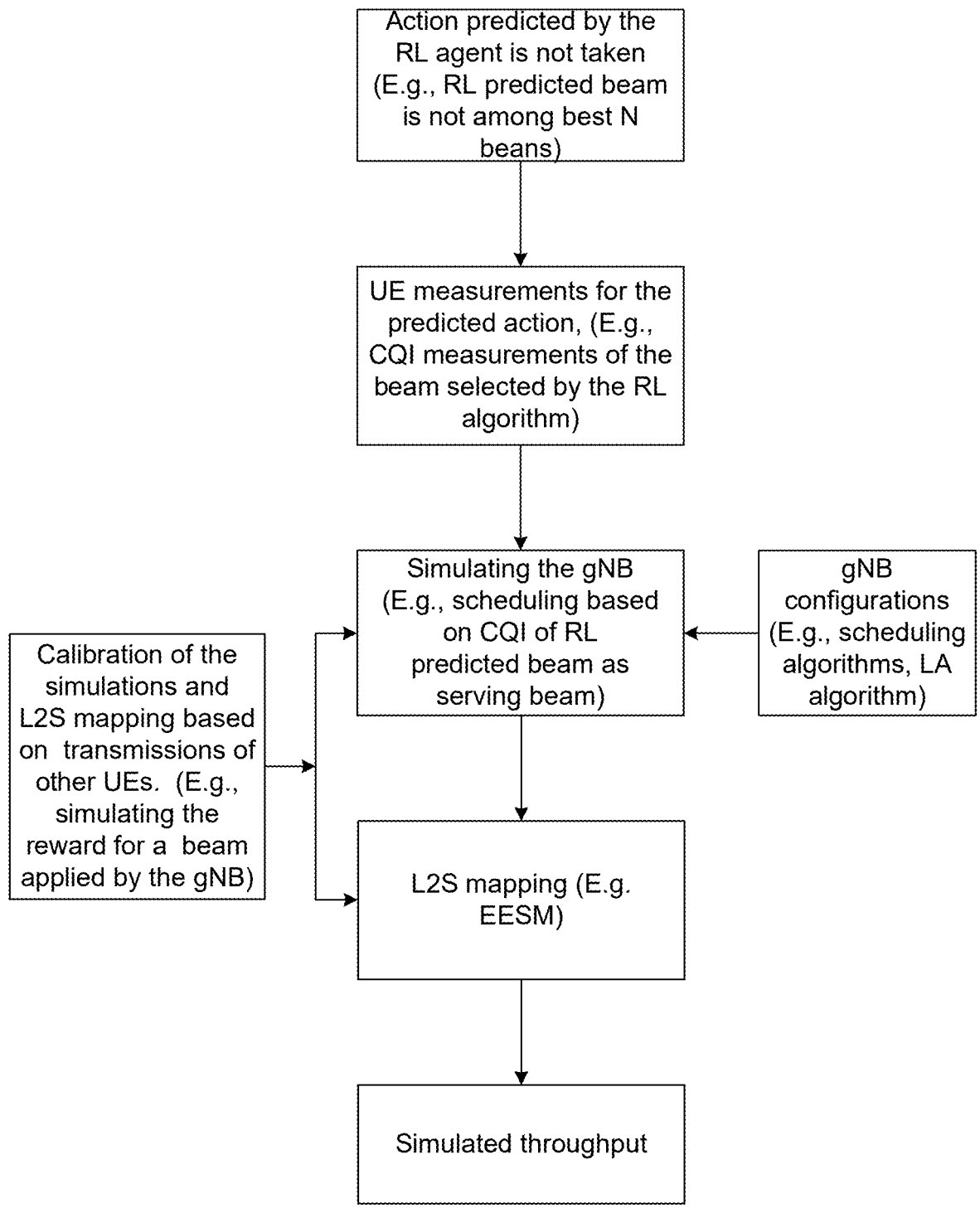
FIG. 11 is a diagram illustrating operations that may be performed for an example reward simulation.

FIG. 11 is a diagram illustrating operations that may be performed for an example reward simulation. Reward simulation may be performed using different methods or techniques based on what KPI (key performance indicator, such as, e.g., throughput) needs to be simulated. To calculate the simulated rewards based on observed measurements without performing the actions beyond the reliability constraints, simulation/emulation framework may be placed in the gNB or any other entity in the network which can support the simulation framework (which can perform the simulation) and is communicating with the gNB. In case of throughput based QoS estimation, L2S mapping can be used to obtain the achievable throughput. First the UE reports the measurements (e.g., CQI and SINR) required to estimate the throughput. For example, this could be CSI (channel state information) reports for the predicted beam. Here, to obtain the number of resources allocated to the UE and to determine link level configuration, certain functionalities of the gNB may be simulated assuming the RL aided predicted action is applied instead of the action applied by the network. For example, resource allocation and link adaptation (LA) may be simulated based on the CSI reports for or related to the predicted beam to simulate the reward. Finally, based on the simulation outcome of gNB functionalities, e.g., allocated amount resources and MCS used to serve the UE, L2S mapping can be used to obtain the estimation of the throughput.

Furthermore, for the calibration of the simulation, L2S mapping can be used to estimate throughput for the real transmissions happening in network. Network can then compare these estimated quantities with the observed quantities for real transmissions to calibrate and fine tune or adjust the throughput simulation method.

Another alternative for generating an instantaneous throughput is by mapping customized SINR/MCS/CQI tables (usually based generated by vendor implementation assumptions) with the system bandwidth (number of resource blocks) to calculate the transport block size in bits using Standardized tables defined in 3GPP TS 36.213 (e.g., Table 7.1.7.2.1-1). Based on the numerology, the value of the Transport Block size (TBS) should be divided by the size of the slot in time domain. For example, if the system is using 15 KHz of subcarrier spacing, the time slot is 1 ms, and the throughput should be TBS/1 ms; and, if the system is using 60 KHz of subcarrier spacing, the time slot is 0.25 ms, and the throughput should be TBS/0.25 ms.

Figure 12:
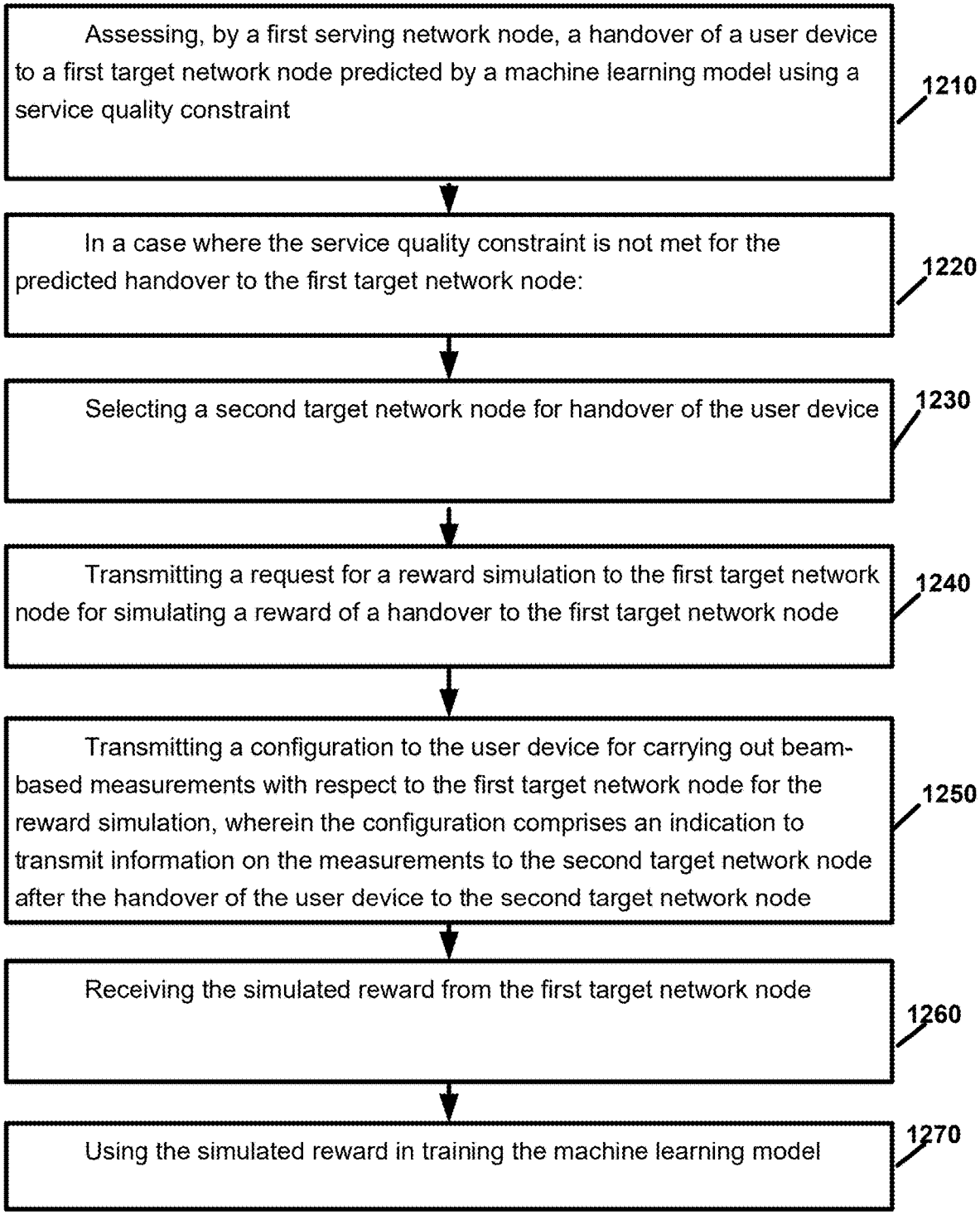
FIG. 12 is a flow chart illustrating operation of a network node.

FIG. 12 is a flow chart illustrating operation of a network node. Operation 1210 includes assessing, by a first serving network node (e.g., gNB), a handover of a user device (e.g., UE) to a first target network node predicted by a machine learning model using a service quality constraint. Operation 1220 includes in a case where the service quality constraint is not met for the predicted handover to the first target network node (performing operation 1230-1270): Operation 1230 includes selecting a second target network node for handover of the user device. Operation 1240 includes transmitting a request for a reward simulation to the first target network node for simulating a reward of a handover to the first target network node. Operation 1250 includes transmitting a configuration to the user device for carrying out beam-based measurements with respect to the first target network node for the reward simulation, wherein the configuration comprises an indication to transmit information on the measurements to the second target network node after the handover of the user device to the second target network node. Operation 1260 includes receiving the simulated reward from the first target network node. Operation 1270 includes using the simulated reward in training the machine learning model.

With respect to the method of FIG. 12, the method may include transmitting, to the user device, a radio resource control (RRC) reconfiguration for simulation measurements with respect to the first target network node.

With respect to the method of FIG. 12, the machine learning model may be located at the first serving network node; or the machine learning model may be located at the user device.

With respect to the method of FIG. 12, the method includes in a case where the service quality constraint is met for the predicted handover to the first target network node, performing the following: performing the handover of the user device to the first target network node; determining an observed reward after performing the handover of the user device to the first target network node; and training or updating the machine learning model based on the observed reward.

With respect to the method of FIG. 12, the method may include training or updating the machine learning model based on at least one of or both: 1) the observed reward after performing the handover of the user device to the first target network node, and/or 2) the simulated reward for the predicted handover of the user device to the first target network node when the predicted handover to the first target network node is not performed.

With respect to the method of FIG. 12, the method may further include transmitting, to the first target network node, an indication that the service quality constraint is not met for the predicted handover of the user device to the first target network node, and information to be used by the first target network node for simulating the reward of the predicted handover to the first target network node.

With respect to the method of FIG. 12, the method may further include transmitting a request to the user device for measurements related to simulation of an additional reward to be simulated by the first target network node; and receiving, from the user device, the measurements related to the simulation of an additional reward.

With respect to the method of FIG. 12, the method may further include transmitting to the first target network node, information required by the first target network node to simulate the additional reward, including the measurements related to the simulation of the additional reward.

With respect to the method of FIG. 12, the method may include receiving from the first target network node the additional simulated reward.

Figure 13:
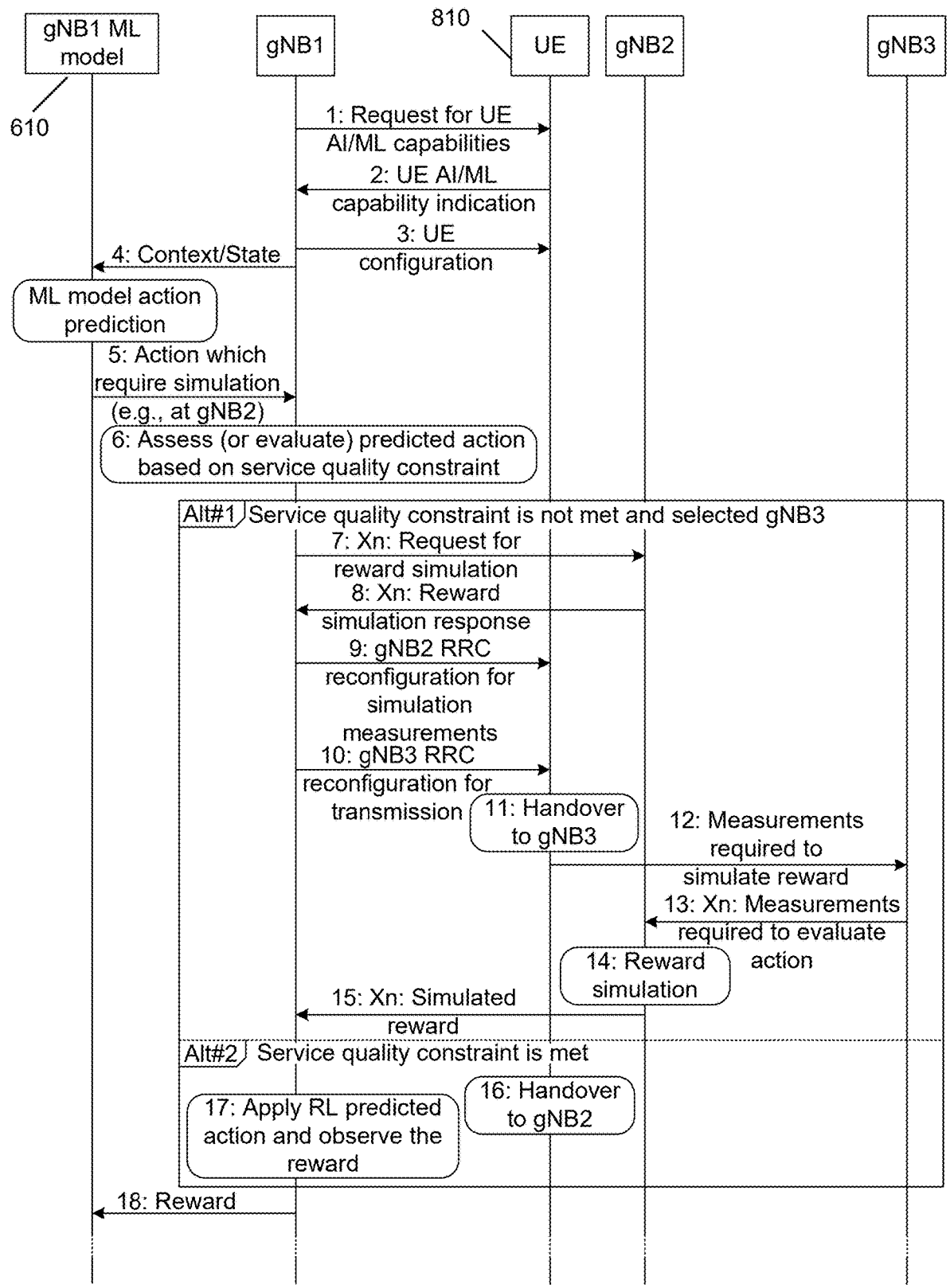
FIG. 13 is a diagram illustrating operation where there is a network node (or gNB) sided ML model and reward simulation is performed based on measurements performed with respect to a non-serving network node.

FIG. 13 is a diagram illustrating operation where there is a network node (or gNB) sided ML model and reward simulation is performed based on measurements performed with respect to a non-serving network node. gNB1 may include a ML model 610 (gNB1 ML model). A UE 810 is in communication with and may be connected to gNB1. Thus, gNB1 is (at least initially) a serving gNB for the UE. The network may include other gNBs, such as gNB2, gNB3, etc. With respect to FIG. 13, gNB1 may be a first serving network node; gNB2 may be a first target network node; and gNB3 may be a second target network node.

Steps 1-4 of FIG. 13 may be the same or similar to Steps 1-4 of FIG. 9, for example. gNB1 (serving gNB) may set a reliability criteria or service quality constraint for a prediction action, such as for a handover of the UE to another (non-serving) gNB, such as a threshold L3 (layer 3) RSRP for UE measured reference signals received by the UE from the gNB, or that the strongest beam of the gNB (as measured by the UE 810) is within top two gNB beams measured by the UE (including among gNB beams of neighbor gNBs). The reliability criteria or service quality constraint may be selected or set, e.g., to minimize the QoS (quality of service) disruptions (e.g., to UE 810) and may be determined or set by the gNB1 based on information known to gNB1. These are two example reliability criteria (service quality constraints), and other reliability criteria may be used.

At Step 5 of FIG. 13, the gNB1 ML model 610 outputs a predicted action (predicted by ML model 610) to gNB1. In an example, the predicted action (e.g., based on the context, state or other inputs provided to the ML model 610) may be a handover of UE 810 to gNB2, or gNB2 may be a predicted target gNB for triggered event (e.g., A3 event, triggered by UE 810, based on a handover configuration provided to UE 810). Thus, in this example, the predicted action may be a handover of the UE 810 to gNB2.

At Step 6 of FIG. 13, the gNB1 may assess or evaluate the predicted action based on (or compared to) the reliability criteria or service quality constraint. In this example, the reliability criteria or service quality constraint may indicate that the beam should be among the top N (e.g., top 2) gNB beams measured by the UE 810, or the L3 RSRP of the gNB2 beam must be greater (or stronger) than a threshold, or strongest beam RSRP of gNB2 is greater than a threshold. Another example reliability criteria is whether the gNB beam is among the gNB beams that are measured by the UE and reported to the serving gNB. As noted, the ML model 610 predicts gNB2 as the target gNB for handover of the UE 810. So, at Step 5, the gNB1 may assess the predicted target gNB (gNB2) to determine if the reliability criteria for predicted handover to gNB2 is met, e.g., whether the RSRP of gNB2 is greater than the threshold RSRP or whether the strongest beam RSRP for gNB2 measured is among the top N gNB beams measured by UE 810. Alternative #1 is performed (Steps 7-15) if the predicted action does not meet the reliability criteria or service quality constraint. Alternative #2 is performed (Steps 16-17) if the predicted action meets the reliability criteria.

At alternative #1, the reliability criteria or service quality constraint is not met by the predicted target gNB (gNB2) for UE handover. An alternative action is performed, which may be unrelated to the ML model (e.g., not predicted by the ML model 610), may be determined by expert knowledge or a set of rules, and/or may be an action that meets the reliability criteria or service quality constraint. In this case, the best gNB beam measured by the UE 810 is gNB3 (the best beam measured for gNB3 is the best gNB beam for the UE 810). Thus, gNB1 selects gNB3 as the target gNB for handover for the UE 810. In this case, because the predicted action (e.g., handover of UE to gNB2) is not performed because that predicted action did not meet the reliability criteria or service quality constraint, the alternative action is performed, e.g., a handover of the UE 810 to gNB3 is (or may be) performed or initiated by gNB1 (e.g., by gNB1 transmitting a handover command or a handover configuration for gNB3 to UE 810). Because the predicted action, e.g., the predicted handover of UE 810 to gNB2 is not performed, the reward for that predicted (and not performed) action is then simulated, and the simulated reward is then provided to the gNB1. gNB1 may then train or update the ML model 610 (e.g., adjust or train weights of the ML model 610) based on the simulated reward.

At Step 7 of FIG. 13, gNB1 transmits a request for reward simulation to the node that performs reward simulation. In the example shown in FIG. 13, the reward simulation is performed at gNB2, but in general reward simulation may be performed by a simulation entity, which may be gNB2, or may be another node or entity (e.g., a node or entity at another gNB, in the cloud, in the core network). The request for reward simulation may indicate what KPI (key performance indicator), parameter or value should be simulated for the simulated reward, e.g., such as time of outage (e.g., a period of time in which the UE 810 is in a non-connected state (such as RRC idle or RRC inactive states) after attempting the handover to gNB2), whether a radio link failure (RLF) occurred, throughput or other KPI. These are just some examples, and other parameters or KPIs may be used as a simulated reward. The simulated reward is simulated (e.g., estimates throughput) as if the handover of UE 810 to gNB2 was performed (even though that action/handover of UE to gNB2 was not performed).

At Step 8 of FIG. 13, the gNB2 sends a reward simulation response to gNB1, which may indicate one or more measurements (e.g., CQI (channel quality indication) and/or RSRP (reference signal received power) of beams of gNB2) related to the predicted action (e.g., related to gNB2 or related to a handover of gNB2) to be provided for simulation.

At Step 9 of FIG. 13, based on this information received at Step 8, gNB1 configures (e.g., by transmitting to UE 810 a gNB2 RRC reconfiguration for simulation message) UE 810 to perform the requested measurements, e.g., to perform CQI and/or RSRP measurements of gNB2 beams, for reward simulation. For example, different beams of gNB2 should be measured in order to find the best or strongest gNB2 beam, measured by the UE 810. Therefore, for example, at Step 9 of FIG. 13, the gNB2 RRC reconfiguration for simulation message may include a configuration to the UE 810 to carry out or perform beam-based measurements with respect to gNB2 (the predicted gNB for handover) for the reward simulation, wherein the configuration may include an indication to transmit information on the measurements of gNB2 beams to gNB3 after the handover of the UE 810 to gNB3.

At Step 10 of FIG. 13, UE 810 receives from serving gNB1 a gNB3 RRC reconfiguration for transmission (e.g., a handover configuration to gNB3), where gNB3 has been selected by serving gNB1 to serve UE 810 based on rules, domain specific knowledge, etc. Thus, the UE 810 is configured to establish a connection and/or handover to gNB3, which is the best gNB for the UE.

At Step 11 of FIG. 13, the UE 810 may establish a connection to gNB3 and perform a handover to gNB3, e.g., based on the gNB3 RRC reconfiguration for transmission received by UE 810 at Step 10. After handover of UE 810 to gNB3, the UE 810 is connected to gNB3.

At Step 12, based on the gNB2 RRC reconfiguration for simulation message (requesting the UE 810 to measure CQI and RSRP of gNB2 beams) received by UE 810 at Step 9, UE 810 will perform or carry out the requested CQI and RSRP measurements of gNB2 beams. Also at Step 12, the UE 810 reports these beam measurements of gNB2 to gNB3, which is the current serving gNB for UE 810. The beam based measurements (e.g., CQI and RSRP measurements of gNB2 beams, measured by UE 810) may be required by gNB2 (or other simulation entity) to perform the reward simulation, e.g., to estimate throughput based on the beam measurements of gNB2. If the handover of UE 810 is not performed, then the UE 810 would report the beam measurements of gNB2 to gNB1.

At Step 13, the current serving gNB (gNB3) sends or transmits the measurements required to perform reward simulation (received from UE 810 to the node or entity (e.g., gNB2 or a simulation entity within the network) that will be performing the reward simulation. In this example, gNB3 transmits the CQI and RSRP beam measurements of gNB2 measured by UE 810 to gNB2 because (in this example) gNB2 will be performing the reward simulation (e.g., simulating a reward, such as estimated throughput) as if the UE handover to gNB2 had been performed).

At Step 14 of FIG. 13, gNB2 (or other node or entity that will be performing the simulation) simulates a reward (e.g., such as estimated throughput) as if the UE handover to gNB2 had been performed. At Step 15, gNB2 transmits or sends the simulated reward (e.g., estimated throughput) to gNB1, so that gNB1 may train the ML model 610 located at gNB1 based on the simulated reward. As noted, this is a simulated reward because the predicted action (e.g., handover of UE to gNB2) is not actually performed and actual or real reward observed, but rather, the predicted action is omitted or not performed if the predicted action does not meet the reliability criteria or service quality constraints. Thus, the simulated reward is calculated or estimated, e.g., to estimate the throughput as if (or based on the assumption that) the handover of UE 810 to gNB2 had been performed.

Alternative #2 is performed (Steps 16-17) if the predicted action meets the reliability criteria or service quality constraint, e.g., if the RSRP of gNB2 beam is greater than the RSRP threshold, or alternatively the beam measurement of gNB2 is within the top N (e.g., top 2 or top 4) gNB beams measured by the UE 810.

At Step 16 of FIG. 13, because the reliability criteria or service quality constraint is met for the predicted action (e.g., for gNB2 or for predicted handover to gNB2), the predicted action is performed or applied. In this example, the handover of UE 810 is performed to gNB2. At Step 17 of FIG. 13, gNB1 observes the real or actual reward, e.g., by observing or detecting the throughput for UE with respect to gNB2. At Step 18 of FIG. 13, the real or actual reward (e.g., real or actual or observed/detected throughput for UE 810) is then provided to gNB1 ML model 610, so that the weights of ML model 610 may be trained or adjusted.

In another example, instead of reporting the measurements in Step 12, if the UE 810 is capable of dual connectivity (two connections to different gNBs at the same time), in Step 9, gNB3 can reconfigure UE 810 to establish a connection with gNB2 to obtain more accurate measurements. This may lead to more accurate reward simulation in case reward is based on throughput, e.g., perform beam refinement between gNB2 and UE 810 before the measurements and then perform the reward simulation.

Figure 14:
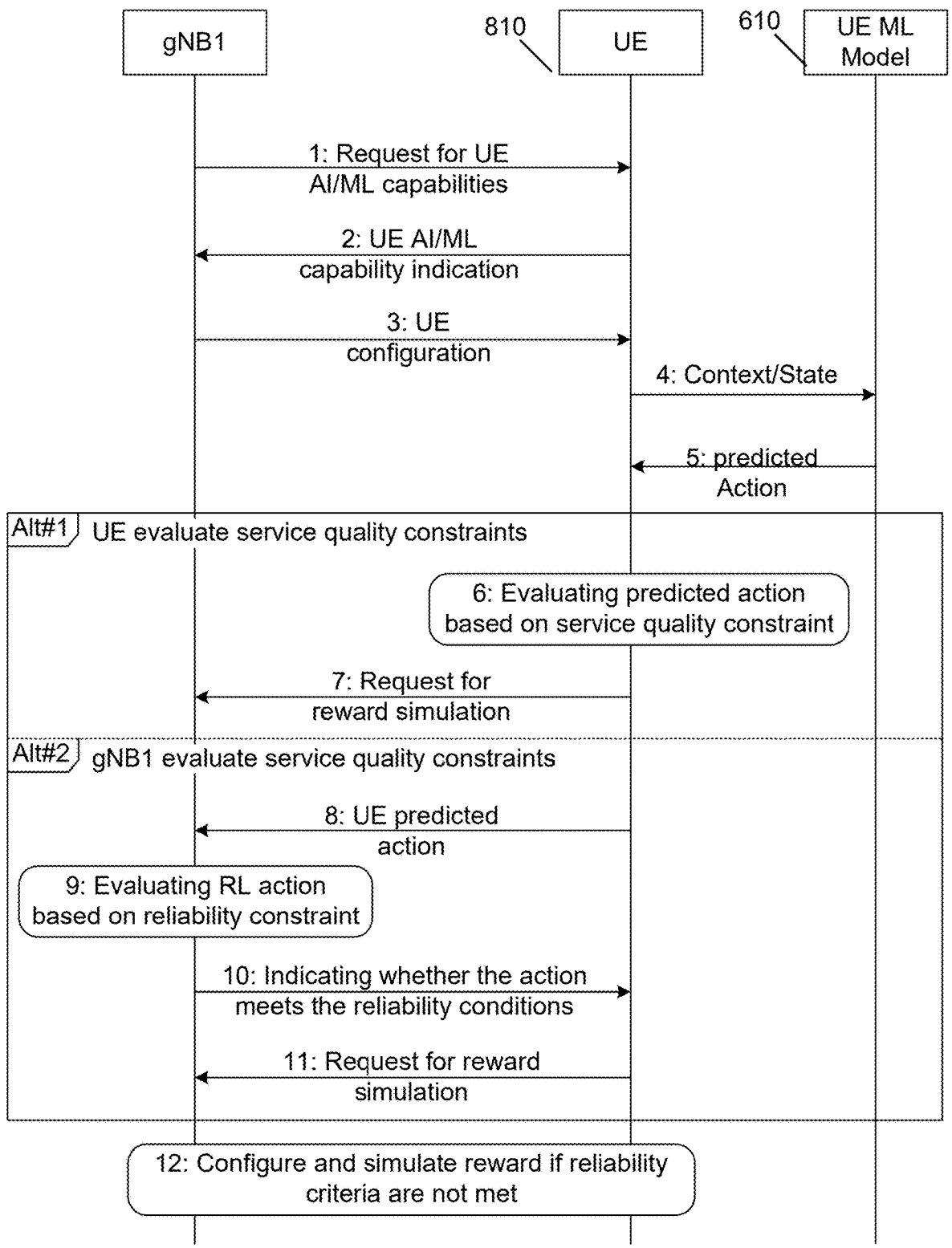
FIG. 14 is a diagram illustrating operation where there is a user device (or UE) sided ML model and reward simulation is performed based on measurements performed with respect to a non-serving network node.

FIG. 14 is a diagram illustrating operation where there is a user device (or UE) sided ML model and reward simulation is performed based on measurements performed with respect to a non-serving network node. In this example, the evaluation of a predicted action against a reliability criteria or service quality constraint may be performed at either UE 810 or gNB1. The non-serving gNBs gNB2 and gNB3 are not shown in FIG. 14.

At Steps 1-5 of FIG. 14, these steps are the same as FIG. 13, except for Step 3 where the UE configuration may include the reliability criteria or service quality constraint to allow the UE to assess or evaluate the predicted action against the reliability criteria (in a case where UE 810 evaluated reliability criteria to determine whether to perform the predicted action or not). Although not shown in FIG. 14, the process for requesting measurements and configuration the UE to perform the requested measurements for simulation, obtaining the measurements and forwarding the measurements (required for reward simulation), and for calculating and/or obtaining the simulated reward, may be performed in the same or similar manner as shown and described in, e.g., Steps 7-15 of FIG. 13. At Step 5 of FIG. 14, the UE ML model 610 outputs or provides a predicted action, e.g., handover of UE 810 to gNB2 (see FIG. 13 for gNB2 and gNB3).

Alternative #1 (including Steps 6-7) is for a case where the UE 810 evaluates (or assesses) whether the predicted action meets the reliability criteria or service quality constraint. At Step 6, the UE evaluates or assesses whether the predicted action (e.g., handover of UE 810 to gNB2) meets the reliability criteria or service quality constraint (which may have been received by the UE 810 via UE configuration at Step 3). If the predicted action meets the reliability criteria, then the UE 810 may perform the predicted action, e.g., a handover of UE to gNB2 (the real reward may be observed if the handover of UE 810 is performed to gNB2). For example, the UE may assess whether a predicted action meets a reliability criteria. As an example evaluation of a UE predicted action, UE may evaluate whether a triggered event, e.g., an A3 event for handover triggered by UE 810, was triggered within a permitted time window for Time to Trigger (if the A3 event is within the Time to Trigger range configured by gNB1, then the predicted action is performed by UE. If the predicted action (e.g., A3 event) does not meet the reliability criteria (e.g., A3 event was not triggered within Time to Trigger (TTT) range configured by gNB1, then at Step 7, the UE transmits a request for reward simulation to gNB1. For example, at Step 7, UE 810 may indicate to gNB1 that the decision predicted to trigger the event too early (not within the TTT range configured by gNB1), and the UE is requesting simulated reward for this predicted action.

Alternative #2 (including Steps 8-11) is for a case where gNB1 evaluates the reliability criteria or service quality constraints. In this case, the predicted action may be where the UE suggests a target gNB (e.g., gNB2) when an A3 event is triggered at the UE (but the UE does not evaluate whether reliability criteria were met or not for the predicted action, but relies on gNB1 to make that evaluation). At Step 8, UE indicates the predicted action as a suggestion, e.g., UE suggests that handover be performed for UE to gNB2. At Step 9, gNB1 evaluates or assesses the predicted action against the reliability criteria, e.g., whether the strongest target gNB beam is among top N gNB beams measured by UE 810. In this example, the gNB1 determines that the predicted action does not meet the reliability criteria or service quality constraints. At Step 10, gNB1 indicates to UE 810 that the suggested action (predicted action) does not meet the reliability criteria or service quality constraints. At Step 11, the UE 810 transmits a request to gNB1 to request a simulated reward for this suggested or predicted action. At Step 12 of FIG. 14, steps are taken to configure the UE to perform measurements related to the predicted or suggested action, perform the measurements, forward the measurements, and calculate and provide the simulated reward for this predicted or suggested action (see, e.g., Steps 7-15 of FIG. 13 for example steps that may be performed to obtain measurements, calculate the simulated reward and provide the simulated reward).

In addition, a system may be provided in which ML models are provided at both a UE 810 and a gNB (e.g., gNB1). Thus, such a system would include a UE sided ML model (sec FIG. 14) and a gNB sided ML model (e.g., see FIG. 13). The operation of this type of system may include one or more steps or operations from any (or multiple) of FIGS. 9, 10, 13, 14 and/or 15, for example. Although FIG. 15 is shown such that gNB1 and gNB2 each include a ML mode or RL agent, a system may be provided as shown in FIG. 15, except UE1 and/or UE2 may include their own ML model or RL agent as well, or a UE may have a ML model in place (or instead) of gNB2.

Figure 15:
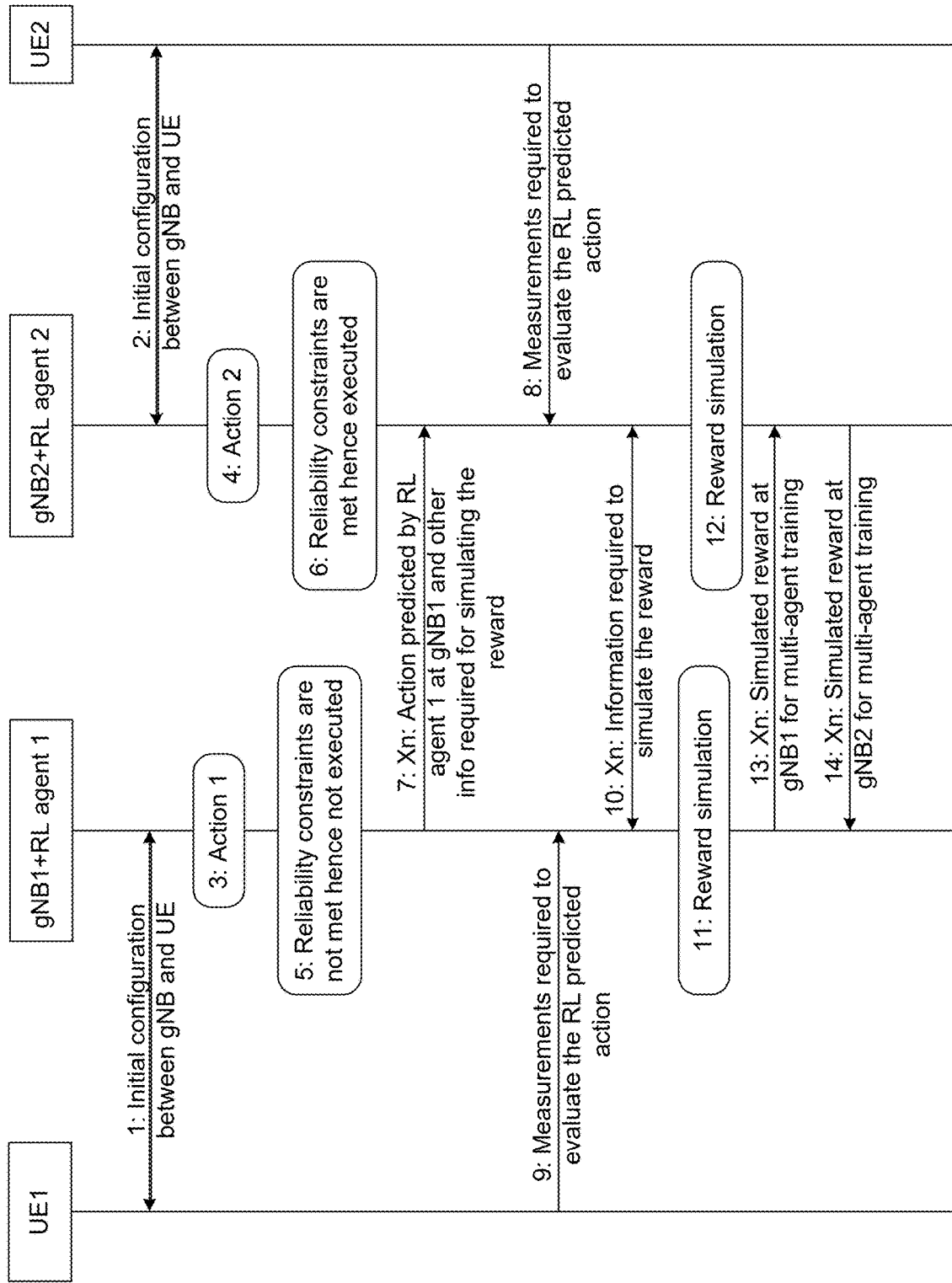
FIG. 15 is a diagram illustrating operation where RL agents or ML models are provided at multiple nodes, UEs or gNBS.

FIG. 15 is a diagram illustrating operation where RL agents or ML models are provided at multiple nodes, UEs or gNBS. In this example, there is a RL agent (and thus ML model) at each of gNB1 and gNB2, and the RL agents may communicate and/or coordinate (and/or assist each other) with each other, with each RL agent adapting its own ML model, e.g., to reach an optimal or improved strategy or solution. Steps 1-2 may correspond to Steps 1-3 of FIG. 13. At Steps 3-4 of FIG. 15, the RL agents or ML models (at both gNBs) may predict an action (each ML model outputs or provides a predicted action).

At Step 5 of FIG. 15, the predicted action 1 does not meet the reliability criteria for RL agent 1 (at gNB1), and thus predicted action 1 is not performed by gNB1. And an alternative action is performed by gNB1, e.g., based on a set of rules or expert knowledge, etc. A simulated reward will be obtained for the predicted action 1. Whereas, at Step 6 of FIG. 15, it is determined by gNB2 that the predicted action 2 meets the reliability criteria for RL agent 2 (at gNB2), and thus predicted action 2 is performed by gNB2. The simulation of reward for predicted action 1 may require simulation of metrics needed to calculate the reward for gNB1 RL agent predicted action 1. Furthermore, since gNB1 action affects the reward of gNB2 action, e.g., due to interference, gNB2 action 2 reward metrics may also need to be simulated assuming the gNB1 RL agent predicted action 1 is performed. Thus, in the example shown in FIG. 15, a reward may be simulated by each of gNB1 and gNB2.

At Step 7 of FIG. 15, gNB1 indicates to the gNB2 that the RL predicted action does not meet reliability criteria or service quality constraints, and relevant information is sent to gNB2, including information (e.g., CQI and RSRP beam measurements) required for simulating the reward for this predicted action 1. At Step 8 of FIG. 15, gNB2 requests the UE2 to perform the required/requested measurements, which are then obtained by gNB2 and reported back to gNB1 via Step 10. At Step 9, gNB1 may request UE1 to perform measurements required for simulation of a reward for the predicted action. These measurements are received by gNB1 from UE1, and may be reported or forwarded to gNB2 via Step 10.

At Step 10 of FIG. 15, the two gNBs exchange each other's received measurement reports required for reward simulation. Thus, for example, measurements required for the reward simulations may be obtained from UE1 and/or UE2, for each of the reward simulations. Hence, UE measurements may be obtained, and then forwarded to the other gNB to be used in the other gNB's reward simulation. At Steps 11 and 12 of FIG. 15, the rewards are simulated at gNB1 (for ML model at RL agent 1) and gNB2 (for the ML model at RL agent 2). At Step 13 of FIG. 15, the reward simulated at gNB1 is forwarded to gNB2, e.g., such that this simulated reward may also be used to train the ML model at RL agent 2 as well. Likewise, at Step 14 of FIG. 15, the reward simulated at gNB2 is forwarded to gNB1, e.g., such that this simulated reward may also be used by gNB1 to update or train the ML model at gNB1. Thus, for example, both simulated rewards (determined at both gNB1 and gNB2) may be used to update or train each of the other ML models at gNB2 and gNB1. As an example, for the methods or techniques of FIGS. 12-15, reward simulation may be performed or calculated as described hereinabove, or using techniques described in FIG. 11, or other reward simulation technique.

A number of examples will now be described.

Example 1. An apparatus (1600) comprising: at least one processor (1604); and at least one memory (1606) storing instructions that, when executed by the at least one processor, cause the apparatus at least to: receive (210; Step 5, FIG. 9), by a network node (812) from a machine learning model (610), a predicted action; determine (220; Step 6, FIG. 9), by the network node (812), whether a reliability criteria is met for the predicted action; perform (230; Step 11, FIG. 9) the predicted action if the predicted action meets the reliability criteria; and (240) if the predicted action does not meet the reliability criteria: obtain a simulated reward for the predicted action; and train or update (Step 12, FIG. 9) the machine learning model (610) based on the simulated reward for the predicted action.

Example 2. The apparatus (1600) of Example 1, wherein the apparatus caused to obtain the simulated reward comprises the apparatus caused to: calculate (Step 10, FIG. 9), by the network node, the simulated reward based for the predicted action based on one or more measurements related to the predicted action; or obtain, by the network node, the simulated reward for the predicted action from another node.

Example 3. The apparatus (1600) of Example 1, wherein the apparatus (1600) caused to obtain the simulated reward comprises the apparatus caused to: transmit (Step 8, FIG. 9), by the network node (812, FIG. 9) to a user device (810, FIG. 9), a request for the user device to perform one or more measurements related to the predicted action; receive (Step 9, FIG. 9), by the network node (812) from the user device (810), one or more measurements related to the predicted action; and obtain (Step 10, FIG. 9), by the network node (812), a simulated reward for the predicted action based on the one or more measurements received by the network node.

Example 4. The apparatus (1600) of any of Examples 1-3, wherein the apparatus (1600) is caused to: if the predicted action does not meet the reliability criteria, omit performing the predicted action, and perform (Step 7, FIG. 9) an alternative action that is selected without the machine learning model.

Example 5. The apparatus (1600) of any of Examples 1-4, wherein the apparatus (1600) is caused to: if the predicted action meets the reliability criteria, perform (Step 11, FIG. 9) the following: perform the predicted action; determine an observed reward after performing the predicted action; and train or update (Step 12, FIG. 9), by the network node, the machine learning model based on the observed reward.

Example 6. The apparatus (1600) of any of Examples 1-5, wherein the apparatus (1600) is caused to: train or update (Step 12, FIG. 9), by the network node (812), the machine learning model based on both: 1) an observed reward after performing the predicted action, and 2) the simulated reward for the predicted action when the predicted action is not performed.

Example 7. The apparatus (1600) of any of Examples 1-6, wherein the apparatus caused to perform the predicted action comprises the apparatus caused to perform at least one of the following: directly perform, by the network node, the predicted action; or transmit, by the network node to the user device, an indication to cause the user device to perform the predicted action.

Example 8. The apparatus (1600) of any of Examples 1-7, wherein the apparatus (1600) is further caused to: transmit (Step 3, FIG. 9), by the network node to the user device, a configuration to configure the user device to measure and report the one or more measurements related to the predicted action.

Example 9. An apparatus (1600) comprising: at least one processor (1604); and at least one memory (1606) storing instructions that, when executed by the at least one processor, cause the apparatus at least to: receive (310; Step 3, FIG. 9), by a user device (810) from a network node (812), a configuration to configure the user device to measure and report one or more measurements related to a predicted action; receive (320; Step 8, FIG. 9), by the user device (810) from the network node (812), a request for the user device to perform one or more measurements related to the predicted action; perform (330), by the user device (810), the one or more measurements related to the predicted action based on the configuration; and transmit (340; Step 9, FIG. 9), by the user device (810) to the network node, the one or more measurements related to the predicted action to enable the network node to train the machine learning model based on the predicted action and a simulated reward that is based on the one or more measurements.

Example 10. An apparatus (1600) comprising: at least one processor (1604); and at least one memory (1606) storing instructions that, when executed by the at least one processor, cause the apparatus at least to: receive (410; Step 2, FIG. 10), by a user device (810) from a network node (812), a reliability criteria; provide (420, Step 3, FIG. 10), by the user device (810), one or more measurements or context information as inputs to a machine learning model (610); receive (430; Step 4, FIG. 10), by the user device (810) from the machine learning model (610), a predicted action based on the inputs; determine (440; Step 5, FIG. 10), by the user device (810), whether the reliability criteria is met for the predicted action; perform (450; Step 12, FIG. 10), by the user device (810), the predicted action if the predicted action meets the reliability criteria; and (460) if the predicted action does not meet the reliability criteria: obtain (Step 10, FIG. 10) a simulated reward for the predicted action; and train or update (Step 13, FIG. 10) the machine learning model (610) based on the simulated reward for the predicted action.

Example 11. The apparatus (1600) of Example 10, wherein the apparatus caused to obtain the simulated reward comprises the apparatus caused to: transmit (Step 7, FIG. 10), by the user device (810) to the network node (812), a request for the simulated reward for the predicted action; receive (Step 8, FIG. 10), by the user device (810) from the network node (812), a request to perform measurements related to the predicted action; perform and forward (Step 9, FIG. 10), by the user device, the requested measurements to the network node; and receive (Step 11, FIG. 10), by the user device from the network node, the simulated reward for the predicted action.

Example 12. The apparatus (1600) of any of Examples 10-11, wherein the apparatus is caused to: if the predicted action does not meet the reliability criteria, omit performing the predicted action, and perform (Step 12, FIG. 10) an alternative action that is selected without the machine learning model.

Example 13. The apparatus (1600) of any of Examples 10-12, wherein the apparatus caused to train or update the machine learning model comprises the apparatus caused to perform at least one of the following: train or update (Step 13, FIG. 10), by the user device (810), the machine learning model (610) based on the simulated reward for the predicted action; or forward, by the user device (810), the simulated reward for the predicted action to another node to enable the another node to train or update the machine learning model.

Example 14. The apparatus (1600) of any of Examples 10-13, wherein the apparatus is caused to: train or update (Step 13, FIG. 10), by the user device (810), the machine learning model (610) based on both: 1) an observed reward after performing the predicted action, and 2) the simulated reward for the predicted action when the predicted action is not performed.

Example 15. The apparatus (1600) of any of Examples 10-14, wherein the apparatus is further caused to: receive (Step 2, FIG. 10), by the user device (810) from the network node (812), a configuration to configure the user device (810) to perform measurements related to the predicted action.

Example 16. A method comprising: receiving, by a network node from a machine learning model, a predicted action; determining, by the network node, whether a reliability criteria is met for the predicted action; performing the predicted action if the predicted action meets the reliability criteria; and if the predicted action does not meet the reliability criteria: obtaining a simulated reward for the predicted action; and training or updating the machine learning model based on the simulated reward for the predicted action.

Example 17. A method comprising: receiving, by a user device from a network node, a configuration to configure the user device to measure and report one or more measurements related to a predicted action; receiving, by the user device from the network node, a request for the user device to perform one or more measurements related to the predicted action; performing, by the user device, the one or more measurements related to the predicted action based on the configuration; and transmitting, by the user device to the network node, the one or more measurements related to the predicted action to enable the network node to train the machine learning model based on the predicted action and a simulated reward that is based on the one or more measurements.

Example 18. A method comprising: receiving, by a user device from a network node, a reliability criteria; providing, by the user device, one or more measurements or context information as inputs to a machine learning model; receiving, by the user device from the machine learning model, a predicted action based on the inputs; determining, by the user device, whether the reliability criteria is met for the predicted action; performing, by the user device, the predicted action if the predicted action meets the reliability criteria; and if the predicted action does not meet the reliability criteria: obtaining a simulated reward for the predicted action; and training or updating the machine learning model based on the simulated reward for the predicted action.

Example 19. A non-transitory computer-readable storage medium comprising instructions stored thereon that, when executed by at least one processor, are configured to cause a computing system to: receive, by a network node from a machine learning model, a predicted action; determine, by the network node, whether a reliability criteria is met for the predicted action; perform the predicted action if the predicted action meets the reliability criteria; and if the predicted action does not meet the reliability criteria: obtain a simulated reward for the predicted action; and train or update the machine learning model based on the simulated reward for the predicted action.

Example 20. A non-transitory computer-readable storage medium comprising instructions stored thereon that, when executed by at least one processor, are configured to cause a computing system to: receive, by a user device from a network node, a configuration to configure the user device to measure and report one or more measurements related to a predicted action; receive, by the user device from the network node, a request for the user device to perform one or more measurements related to the predicted action; perform, by the user device, the one or more measurements related to the predicted action based on the configuration; and transmit, by the user device to the network node, the one or more measurements related to the predicted action to enable the network node to train the machine learning model based on the predicted action and a simulated reward that is based on the one or more measurements.

Example 21. A non-transitory computer-readable storage medium comprising instructions stored thereon that, when executed by at least one processor, are configured to cause a computing system to: receive, by a user device from a network node, a reliability criteria; provide, by the user device, one or more measurements or context information as inputs to a machine learning model; receive, by the user device from the machine learning model, a predicted action based on the inputs; determine, by the user device, whether the reliability criteria is met for the predicted action; perform, by the user device, the predicted action if the predicted action meets the reliability criteria; and if the predicted action does not meet the reliability criteria: obtain a simulated reward for the predicted action; and train or update the machine learning model based on the simulated reward for the predicted action.

Example 22. A system comprising: a user device (810) comprising at least one first processor (1604), and at least one first memory (1606) storing first instructions, and a network node (812) comprising at least one second processor (1604), and at least one second memory (1606) storing second instructions that, when the first and second instructions are executed by the at least one first processor and the at least one second processor, respectively, cause the system to: receive (410; Step 2, FIG. 10), by the user device (810) from a network node (812), a first reliability criteria; receive (430; Step 4, FIG. 10), by the user device (810) from a user device machine learning model (610, FIG. 10), a first predicted action; obtain (Step 12, FIG. 10), by the user device (810), a first simulated reward for the first predicted action based on the first predicted action not meeting a reliability criteria; train or update (Step 13, FIG. 10) the user device machine learning model (610) based on the first simulated reward for the first predicted action; receive (210; Step 5, FIG. 9), by the network node from a network node machine learning model (610, FIG. 9), a second predicted action; transmit (Step 8, FIG. 9), by the network node (812, FIG. 9) to the user device (810, FIG. 9), a request for the user device to perform one or more measurements related to the second predicted action; receive (Step 9, FIG. 9), by the network node (812) from the user device (810), one or more measurements related to the second predicted action; obtain (240), by the network node (812), a second simulated reward for the second predicted action based on the second predicted action not meeting a second reliability criteria; and train or update (Step 12, FIG. 9) the network node machine learning model (610) based on the second simulated reward for the second predicted action.

Example 23. An apparatus (1600) comprising: at least one processor (1604); and at least one memory (1606) storing instructions that, when executed by the at least one processor, cause the apparatus at least to: assess (1210; Step 6, FIG. 13), by a first serving network node (gNB1, FIG. 13), a handover of a user device (810) to a first target network node (gNB2, FIG. 13) predicted by a machine learning model (610, FIG. 13) using a service quality constraint; in a case where the service quality constraint is not met for the predicted handover to the first target network node (1220): select (1230) a second target network node (gNB3, FIG. 13) for handover of the user device; transmit (1240; Step 7, FIG. 13) a request for a reward simulation to the first target network node (gNB2, FIG. 13) for simulating a reward of a handover to the first target network node; transmit (1250; Step 9, FIG. 12) a configuration to the user device (810) for carrying out beam-based measurements with respect to the first target network node (gNB2, FIG. 13) for the reward simulation, wherein the configuration comprises an indication to transmit information on the measurements to the second target network node (gNB3, FIG. 13) after the handover of the user device (810) to the second target network node (gNB3, FIG. 13); receive (1260; Step 15, FIG. 13) the simulated reward from the first target network node (gNB2, FIG. 13); and use (1270; Step 18, FIG. 13) the reward in training the machine learning model (610).

Example 24. The apparatus of Example 23, wherein the apparatus (1600) is caused to: transmit (Step 9, FIG. 13), to the user device (810), a radio resource control (RRC) reconfiguration for simulation measurements with respect to the first target network node.

Example 25. The apparatus (1600) of Example 23, wherein: the machine learning model (610, FIG. 13) is located at the first serving network node (gNB1); or the machine learning model (610, FIG. 14) is located at the user device (810).

Example 26. The apparatus of any of Examples 23-25, wherein the apparatus (1600) is caused to: in a case where the service quality constraint is met for the predicted handover to the first target network node, perform the following: perform (Step 16, FIG. 13) the handover of the user device (810) to the first target network node (gNB2, FIG. 13); determine an observed reward (Step 17, FIG. 13) after performing the handover of the user device to the first target network node; and train or update (Step 18, FIG. 13) the machine learning model (610) based on the observed reward.

Example 27. The apparatus (1600) of any of Examples 23-26, wherein the apparatus is caused to: train or update (Step 18, FIG. 13) the machine learning model (610) based on at least one of or both: 1) the observed reward after performing the handover of the user device to the first target network node, and/or 2) the simulated reward for the predicted handover of the user device to the first target network node when the predicted handover to the first target network node is not performed.

Example 28. The apparatus (1600) of any of Examples 23-27, wherein the apparatus is further caused to: transmit (Step 7, FIG. 13), to the first target network node (gNB2, FIG. 13), an indication that the service quality constraint is not met for the predicted handover of the user device to the first target network node, and information to be used by the first target network node for simulating the reward of the predicted handover to the first target network node.

Example 29. The apparatus (1600) of any of Examples 23-28, wherein the apparatus is further caused to: transmit (Step 9, FIG. 13) a request to the user device (810) for measurements related to simulation of an additional reward to be simulated by the first target network node (gNB2, FIG. 13); and receive (Step 9, FIG. 15), from the user device (UE1, FIG. 15), the measurements related to the simulation of an additional reward.

Example 30. The apparatus (1600) of Example 29, wherein the apparatus is further caused to: transmit (Step 10, FIG. 15) to the first target network node (gNB2, FIG. 13, FIG. 15), information required by the first target network node (gNB2, FIGS. 13, 15) to simulate the additional reward, including the measurements related to the simulation of the additional reward.

Example 31. The apparatus of Example 30, wherein the apparatus is further caused to: receive (Step 14, FIG. 15) from the first target network node (gNB2, FIGS. 13, 15) the additional simulated reward.

Example 32. A method comprising: assessing, by a first serving network node, a handover of a user device to a first target network node predicted by a machine learning model using a service quality constraint; in a case where the service quality constraint is not met for the predicted handover to the first target network node: selecting a second target network node for handover of the user device; transmitting a request for a reward simulation to the first target network node for simulating a reward of a handover to the first target network node; transmitting a configuration to the user device for carrying out beam-based measurements with respect to the first target network node for the reward simulation, wherein the configuration comprises an indication to transmit information on the measurements to the second target network node after the handover of the user device to the second target network node; receiving the simulated reward from the first target network node; and using the simulated reward in training the machine learning model.

Example 33. The method of Example 32, comprising: transmitting, to the user device, a radio resource control (RRC) reconfiguration for simulation measurements with respect to the first target network node.

Example 34. The method of Example 32, wherein: the machine learning model is located at the first serving network node; or the machine learning model is located at the user device.

Example 35. The method of any of Examples 32-34, comprising: in a case where the service quality constraint is met for the predicted handover to the first target network node, performing the following: performing the handover of the user device to the first target network node; determining an observed reward after performing the handover of the user device to the first target network node; and training or updating the machine learning model based on the observed reward.

Example 36. The method of any of Examples 32-35, comprising: training or updating the machine learning model based on at least one of or both: 1) the observed reward after performing the handover of the user device to the first target network node, and/or 2) the simulated reward for the predicted handover of the user device to the first target network node when the predicted handover to the first target network node is not performed.

Example 37. The method of any of Examples 32-36, further comprising: transmitting, to the first target network node, an indication that the service quality constraint is not met for the predicted handover of the user device to the first target network node, and information to be used by the first target network node for simulating the reward of the predicted handover to the first target network node.

Example 38. The method of any of Examples 32-37, further comprising: transmitting a request to the user device for measurements related to simulation of an additional reward to be simulated by the first target network node; and receiving, from the user device, the measurements related to the simulation of an additional reward.

Example 39. The method of Example 38, further comprising: transmitting to the first target network node, information required by the first target network node to simulate the additional reward, including the measurements related to the simulation of the additional reward.

Example 40. The method of Example 39, further comprising: receiving from the first target network node the additional simulated reward.

Example 41. A non-transitory computer-readable storage medium comprising instructions stored thereon that, when executed by at least one processor, are configured to cause a computing system to: assess, by a first serving network node, a handover of a user device to a first target network node predicted by a machine learning model using a service quality constraint; in a case where the service quality constraint is not met for the predicted handover to the first target network node: select a second target network node for handover of the user device; transmit a request for a reward simulation to the first target network node for simulating a reward of a handover to the first target network node; transmit a configuration to the user device for carrying out beam-based measurements with respect to the first target network node for the reward simulation, wherein the configuration comprises an indication to transmit information on the measurements to the second target network node after the handover of the user device to the second target network node; receive the simulated reward from the first target network node; and use the reward in training the machine learning model.

Figure 16:
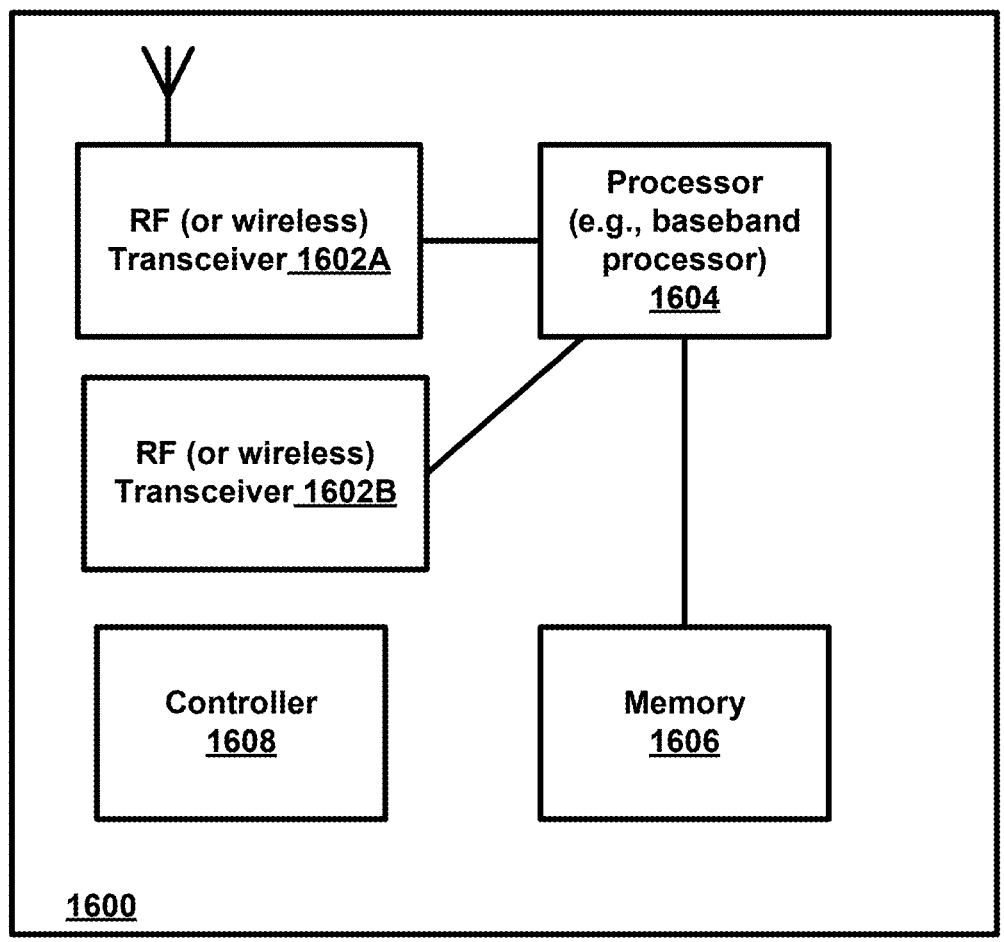
FIG. 16 is a block diagram of a wireless station or node (e.g., UE, user device, AP, BS, eNB, gNB, RAN node, network node, relay node, TRP, or other node) 1600.

FIG. 16 is a block diagram of a wireless station or node (e.g., UE, user device, AP, BS, eNB, gNB, RAN node, network node, TRP, or other node) 1600 according to an example embodiment. The wireless station 1600 may include, for example, one or more (e.g., two as shown in FIG. 16) RF (radio frequency) or wireless transceivers 1602A, 1602B, where each wireless transceiver includes a transmitter to transmit signals and a receiver to receive signals. The wireless station also includes a processor or control unit/entity (controller) 1604 to execute instructions or software and control transmission and receptions of signals, and a memory 1606 to store data and/or instructions.

Processor 1604 may also make decisions or determinations, generate frames, packets or messages for transmission, decode received frames or messages for further processing, and other tasks or functions described herein. Processor 1604, which may be a baseband processor, for example, may generate messages, packets, frames or other signals for transmission via wireless transceiver 1602 (1602A or 1602B). Processor 1604 may control transmission of signals or messages over a wireless network, and may control the reception of signals or messages, etc., via a wireless network (e.g., after being down-converted by wireless transceiver 1602, for example). Processor 1604 may be programmable and capable of executing software or other instructions stored in memory or on other computer media to perform the various tasks and functions described above, such as one or more of the tasks or methods described above. Processor 1604 may be (or may include), for example, hardware, programmable logic, a programmable processor that executes software or firmware, and/or any combination of these. Using other terminology, processor 1604 and transceiver 1602 together may be considered as a wireless transmitter/receiver system, for example.

In addition, referring to FIG. 16, a controller (or processor) 1608 may execute software and instructions, and may provide overall control for the station 1600, and may provide control for other systems not shown in FIG. 16, such as controlling input/output devices (e.g., display, keypad), and/or may execute software for one or more applications that may be provided on wireless station 1600, such as, for example, an email program, audio/video applications, a word processor, a Voice over IP application, or other application or software.

In addition, a storage medium may be provided that includes stored instructions, which when executed by a controller or processor may result in the processor 1604, or other controller or processor, performing one or more of the functions or tasks described above.

According to another example embodiment, RF or wireless transceiver(s) 1602A/1602B may receive signals or data and/or transmit or send signals or data. Processor 1604 (and possibly transceivers 1602A/1602B) may control the RF or wireless transceiver 1602A or 1602B to receive, send, broadcast or transmit signals or data.

Example embodiments are provided or described for each of the example methods, including: An apparatus (e.g., 1600, FIG. 16) including means (e.g., processor 1604, RF transceivers 1602A and/or 1602B, and/or memory 1606, in FIG. 16) for carrying out any of the methods; a non-transitory computer-readable storage medium (e.g., memory 1606, FIG. 16) comprising instructions stored thereon that, when executed by at least one processor (processor 1604, FIG. 16), are configured to cause a computing system (e.g., 1600, FIG. 16) to perform any of the example methods; and an apparatus (e.g., 1600, FIG. 16) including at least one processor (e.g., processor 1604, FIG. 16), and at least one memory (e.g., memory 1606, FIG. 16) including computer program code, the at least one memory (1606) and the computer program code configured to, with the at least one processor (1604), cause the apparatus (e.g., 1600) at least to perform any of the example methods.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IoT).

As used in this application, the term 'circuitry' or "circuit" refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a standalone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a backend component, e.g., as a data server, or that includes a middleware component, e.g., an application server, or that includes a frontend component, e.g., a client computer having a graphical user interface or a Web browser through which a user can interact with an embodiment, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory storing instructions that, when executed by the at least one processor, cause the apparatus at least to perform:
receiving, by a network node from a machine learning model, a predicted action, wherein the predicted action comprises performing a handover of a user device to a predicted target network node;
determining, by the network node, whether a reliability criteria is met for the predicted action, wherein the reliability criteria comprises a threshold value of performance for determining whether the predicted action is acceptable;
transmitting, by the network node to the user device, a request for the user device to perform one or more measurements related to the predicted action, wherein the one or more measurements comprises at least one of:

a reference signal received power measurement; or a channel quality indication measurement; and receiving, by the network node from the user device, the one or more measurements related to the predicted action;

performing the predicted action if the predicted action meets the reliability criteria;

determining an observed reward after performing the predicted action; and training or updating, by the network node, the machine learning model based on the observed reward; and if the predicted action does not meet the reliability criteria:

omitting performing the predicted action;

obtaining a simulated reward for the predicted action, wherein the simulated reward comprises a reward for the predicted action that is not performed, and is calculated based on the one or more measurements related to the predicted action;

training or updating the machine learning model based on the simulated reward for the predicted action; and performing an alternative action that is selected without any machine learning model.

2. The apparatus of claim 1, wherein the obtaining the simulated reward comprises:

calculating, by the network node, the simulated reward based for the predicted action based on one or more measurements related to the predicted action; or obtaining, by the network node, the simulated reward for the predicted action from another node.

3. The apparatus of claim 1, wherein the apparatus is caused to perform:

training or updating, by the network node, the machine learning model based on both: an observed reward after performing the predicted action, and the simulated reward for the predicted action when the predicted action is not performed.

4. The apparatus of claim 1, wherein the performing the predicted action comprises at least one of the following:

directly performing, by the network node, the predicted action; or transmitting, by the network node to the user device, an indication to cause the user device to perform the predicted action.

5. The apparatus of claim 1, wherein the apparatus is further caused to perform:

transmitting, by the network node to the user device, a configuration to configure the user device to measure and report the one or more measurements related to the predicted action.

6. An apparatus comprising:

at least one processor; and at least one memory storing instructions that, when executed by the at least one processor, cause the apparatus at least to perform:

receiving, by a user device from a network node, a reliability criteria, wherein the reliability criteria comprises a threshold value of performance for determining by the network node whether a predicted action is acceptable;

providing, by the user device, one or more measurements or context information as inputs to a machine learning model, wherein the one or more measurements comprises at least one of:

a reference signal received power measurement; or a channel quality indication measurement;

receiving, by the user device from the machine learning model, a predicted action based on the inputs, wherein the predicted action comprises performing a handover of the user device to a predicted target network node;

determining, by the user device, whether the reliability criteria is met for the predicted action;

performing, by the user device, the predicted action if the predicted action meets the reliability criteria;

determining an observed reward after performing the predicted action; and training or updating, by the network node, the machine learning model based on the observed reward; and if the predicted action does not meet the reliability criteria:

omitting performing the predicted action;

obtaining a simulated reward for the predicted action, wherein the simulated reward comprises a reward for the predicted action that is not performed, and wherein the reward is calculated based on the one or more measurements related to the predicted action;

training or updating the machine learning model based on the simulated reward for the predicted action; and performing an alternative action that is selected without any machine learning model.

7. The apparatus of claim 6, wherein the obtaining the simulated reward comprises:

transmitting, by the user device to the network node, a request for the simulated reward for the predicted action;

receiving, by the user device from the network node, a request to perform measurements related to the predicted action;

performing and forwarding, by the user device, the requested measurements to the network node; and receiving, by the user device from the network node, the simulated reward for the predicted action.

8. The apparatus of claim 6, wherein the training or updating the machine learning model comprises at least one of the following:

training or updating, by the user device, the machine learning model based on the simulated reward for the predicted action; or forwarding, by the user device, the simulated reward for the predicted action to another node to enable the another node to train or update the machine learning model.

9. The apparatus of claim 6, wherein the apparatus is caused to perform:

training or updating, by the user device, the machine learning model based on both:

an observed reward after performing the predicted action, and the simulated reward for the predicted action when the predicted action is not performed.

10. The apparatus of any of claim 6, wherein the apparatus is further caused to perform:

receiving, by the user device from the network node, a configuration to configure the user device to perform measurements related to the predicted action.

11. A method comprising:

receiving, by a network node from a machine learning model, a predicted action, wherein the predicted action comprises performing a handover of a user device to a predicted target network node;

determining, by the network node, whether a reliability criteria is met for the predicted action, wherein the reliability criteria comprises a threshold value of performance for determining whether the predicted action is acceptable;

transmitting, by the network node to the user device, a request for the user device to perform the one or more measurements related to the predicted action, wherein the one or more measurements comprises at least one of:
 a reference signal received power (RSRP) measurement; or
 a channel quality indication (CQI) measurement; and receiving, by the network node from the user device, one or more measurements related to the predicted action;

performing the predicted action if the predicted action meets the reliability criteria;
 determining an observed reward after performing the predicted action; and
 training or updating, by the network node, the machine learning model based on the observed reward; and if the predicted action does not meet the reliability criteria:
 omitting performing the predicted action;
 obtaining a simulated reward for the predicted action, wherein the simulated reward comprises a reward for a predicted action that is not performed, and is calculated based on the one or more measurements related to the predicted action;
 training or updating the machine learning model based on the simulated reward for the predicted action; and
 performing an alternative action that is selected without any machine learning model.

* * * * *